United States Patent
Kang et al.

(10) Patent No.: US 11,133,853 B2
(45) Date of Patent: *Sep. 28, 2021

(54) METHOD AND APPARATUS FOR TRANSMITTING AND RECEIVING CHANNEL STATE INFORMATION-REFERENCE SIGNAL (CSI-RS)

(71) Applicant: LG Electronics Inc., Seoul (KR)

(72) Inventors: Jiwon Kang, Seoul (KR); Jonghyun Park, Seoul (KR); Kilbom Lee, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/717,316

(22) Filed: Dec. 17, 2019

(65) Prior Publication Data

US 2020/0127722 A1 Apr. 23, 2020

Related U.S. Application Data

(63) Continuation of application No. 16/126,462, filed on Sep. 10, 2018, which is a continuation of application No. PCT/KR2018/008296, filed on Jul. 23, 2018.
(Continued)

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0456* (2013.01); *H04B 7/0695* (2013.01);
(Continued)

(58) Field of Classification Search
CPC ............... H04B 7/0626; H04W 76/27; H04W 72/0446; H04W 24/10; H04L 5/0048;
(Continued)

(56) References Cited

U.S. PATENT DOCUMENTS

| 10,104,583 | B2 | 10/2018 | Wang et al. |
| 2011/0222472 | A1 | 9/2011 | Breit et al. |

(Continued)

FOREIGN PATENT DOCUMENTS

| JP | 201728708 | 2/2017 |
| JP | 2017028708 | 2/2017 |

(Continued)

OTHER PUBLICATIONS

Catt, "Views on CSI framework," R1-1710060, 3GPP TSG RAN WG1 NR-AdHoc#2, Qingdao, P.R. China Jun. 27-30, 2017, 4 pages.
(Continued)

*Primary Examiner* — Sophia Vlahos
(74) *Attorney, Agent, or Firm* — Fish & Richardson P.C.

(57) ABSTRACT

Disclosed is a method for transmitting and receiving a channel state information (CSI)-reference signal (RS) in a wireless communication system.
Specifically, the method performed by a base station may include: configuring control information indicating that an antenna port for all CSI-RS resources included in a CSI-RS resource set is same, wherein the CSI-RS resource set is used for tracking at least one of a time or a frequency; transmitting the configured control information to a user equipment (UE); and transmitting the CSI-RS to the UE through all the CSI-RS resources.
In doing so, the UE is capable of performing time/frequency tracking more precisely.

16 Claims, 17 Drawing Sheets

Related U.S. Application Data

(60) Provisional application No. 62/554,586, filed on Sep. 6, 2017, provisional application No. 62/541,115, filed on Aug. 4, 2017, provisional application No. 62/535,243, filed on Jul. 21, 2017.

(51) Int. Cl.
| | |
|---|---|
| *H04J 13/16* | (2011.01) |
| *H04W 76/27* | (2018.01) |
| *H04B 7/0456* | (2017.01) |
| *H04W 72/04* | (2009.01) |
| *H04L 27/26* | (2006.01) |

(52) U.S. Cl.
CPC .............. *H04J 13/16* (2013.01); *H04L 5/005* (2013.01); *H04L 5/0023* (2013.01); *H04L 5/0048* (2013.01); *H04L 5/0094* (2013.01); *H04W 76/27* (2018.02); *H04L 27/261* (2013.01); *H04W 72/0446* (2013.01)

(58) Field of Classification Search
CPC ..... H04L 5/0023; H04L 5/005; H04L 5/0094; H04L 27/261; H04J 13/16
See application file for complete search history.

(56) References Cited

U.S. PATENT DOCUMENTS

| | | | |
|---|---|---|---|
| 2012/0120905 A1* | 5/2012 | Ko | H04L 5/0048 370/329 |
| 2012/0213261 A1* | 8/2012 | Sayana | H04L 5/0048 375/224 |
| 2013/0070719 A1 | 3/2013 | Xu et al. | |
| 2015/0055588 A1 | 2/2015 | Yerramalli et al. | |
| 2015/0318954 A1 | 11/2015 | Park et al. | |
| 2016/0006547 A1* | 1/2016 | Kang | H04L 5/0048 370/329 |
| 2016/0269978 A1* | 9/2016 | Bashar | H04J 11/00 |
| 2016/0301511 A1 | 10/2016 | Yoon et al. | |
| 2017/0005767 A1 | 1/2017 | Kang et al. | |
| 2017/0180194 A1 | 6/2017 | Noh et al. | |
| 2018/0219606 A1 | 8/2018 | Ng et al. | |
| 2018/0241452 A1 | 8/2018 | Akkarakaran et al. | |
| 2018/0279145 A1 | 9/2018 | Jung et al. | |
| 2018/0279152 A1 | 9/2018 | Kim et al. | |
| 2018/0287681 A1 | 10/2018 | Chen et al. | |
| 2018/0324678 A1 | 11/2018 | Chen et al. | |
| 2018/0343595 A1 | 11/2018 | da Silva et al. | |
| 2019/0052443 A1 | 2/2019 | Cheng et al. | |
| 2019/0334676 A1* | 10/2019 | Liu | H04L 5/0094 |
| 2020/0059874 A1 | 2/2020 | Noh et al. | |

FOREIGN PATENT DOCUMENTS

| | | | | |
|---|---|---|---|---|
| WO | WO 2017/193973 | * | 11/2007 | ......... H04L 25/0226 |
| WO | WO2013050895 | | 4/2013 | |
| WO | 2017010753 | | 1/2017 | |
| WO | WO2017135990 | | 8/2017 | |

OTHER PUBLICATIONS

Ericsson, "On DL beam indication," R1-1711015, 3GPP TSG-RAN WG1 #89ah-NR, Qingdao, China, Jun. 27-30, 2017, 8 pages.

LG Electronics, "On CS1-RS design for CSI acquisition," R1-1707613, 3GPP TSG RAN WG1 Meeting #89, Hangzhou, PR China May 15-19, 2017, 5 pages.

Samsung, "Discussions on CS1-RS design for NR MIMO," R1-1707970, 3GPP TSG RAN WG1 Meeting #89, Hangzhou, China, May 15-19, 2017, 9 pages.

Samsung, "Discussions on fine time/frequency tracking for NR," R1-1707980, 3GPP TSG RAN WG1 Meeting #88bis, Hangzhou, China, May 15-19, 2017, 8 pages.

MediaTek Inc., "On reference signal for fine time and frequency tracking," R1-1704470, 3GPP TSG-RAN WG1 Meeting #88 bis, Spokane, USA, dated Apr. 3-7, 2017, 6 pages.

Extended European Search Report in European Application No. 18811696.6, dated Jan. 17, 2020, 9 pages.

United States Office Action in U.S. Appl. No. 16/126,462, dated Feb. 27, 2020, 26 pages.

U.S. Notice of Allowance in U.S. Appl. No. 16/126,462, dated Apr. 20, 2021, 13 pages.

JP Office Action in Japanese Appln. No. , dated , pagtes (with English transklation.

Japanese Office Action in Japanese Appln. No. 2020-509411, dated Dec. 22, 2020, 14 pages (with English translation).

* cited by examiner

[Figure 1]
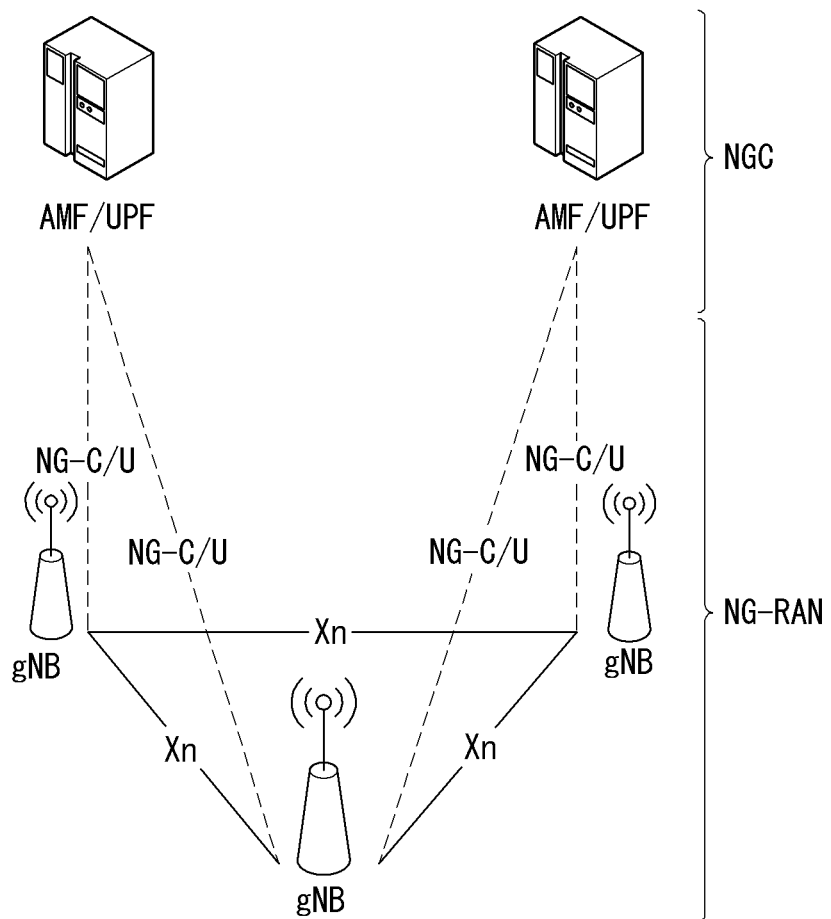
[Figure 2]
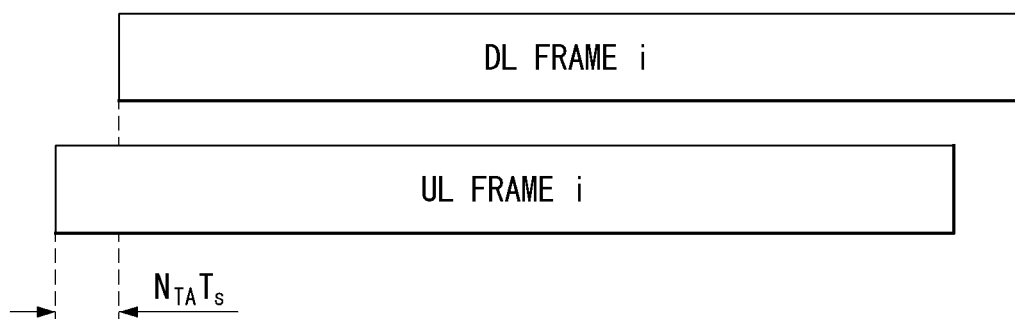

[Figure 3]
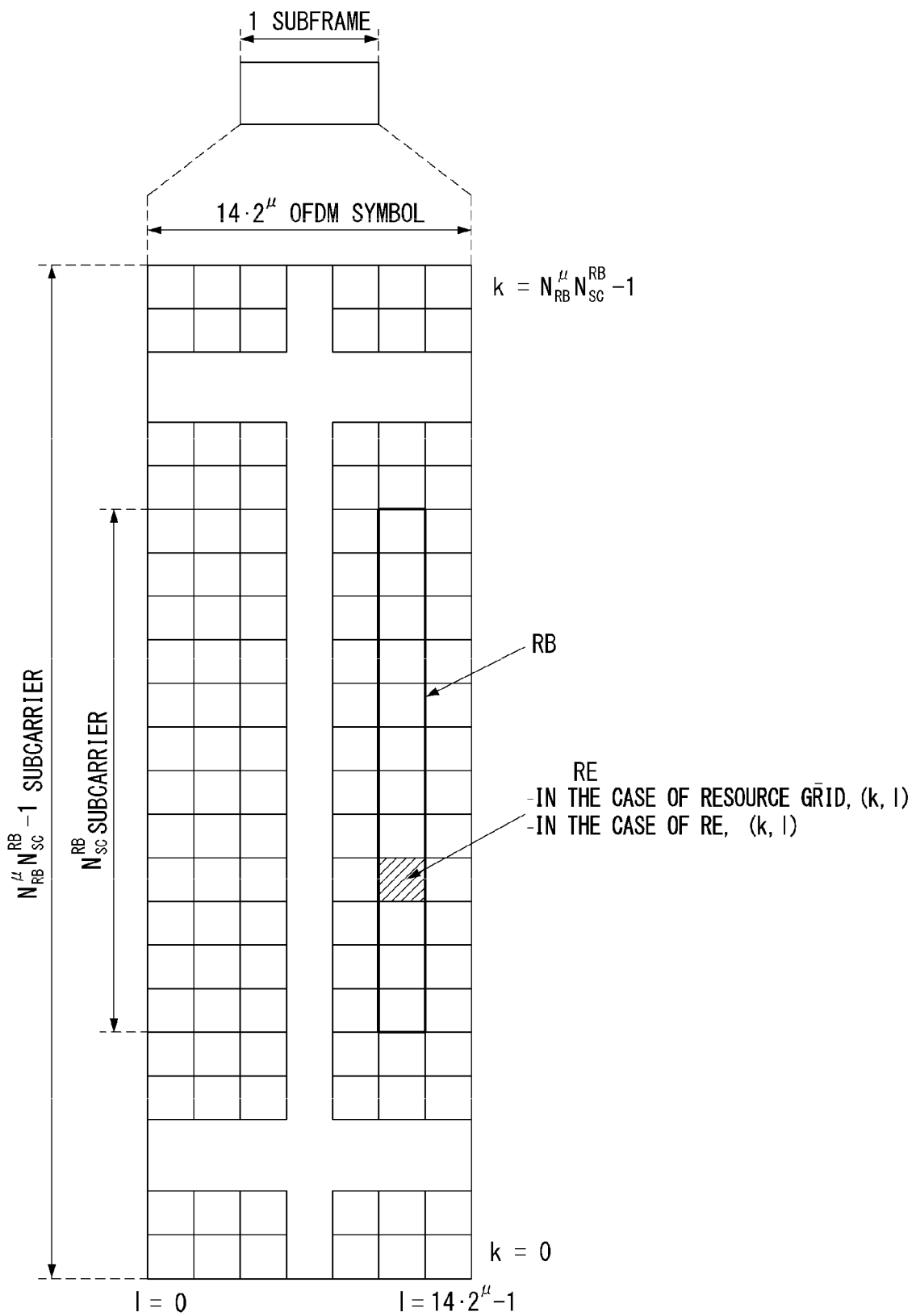

[Figure 4]
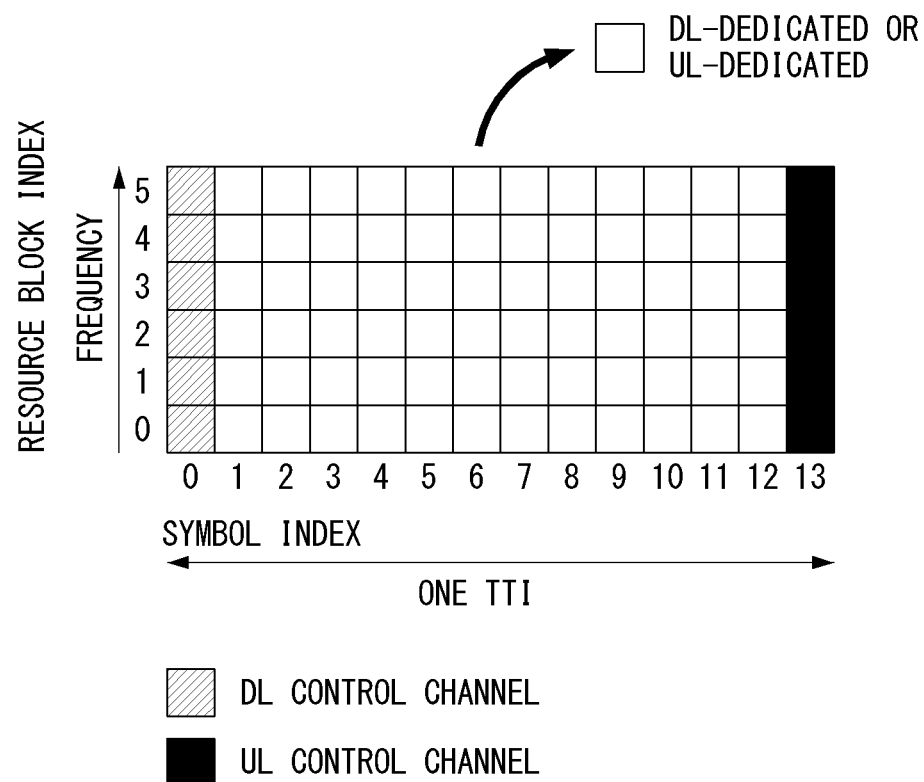

[Figure 5]
(a)
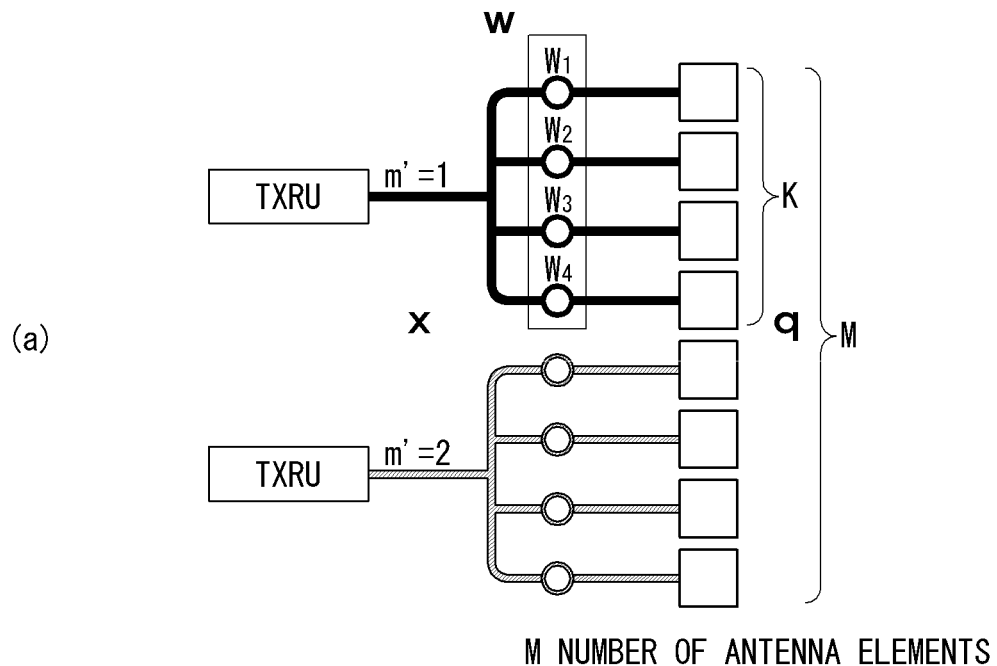
M NUMBER OF ANTENNA ELEMENTS
(b)
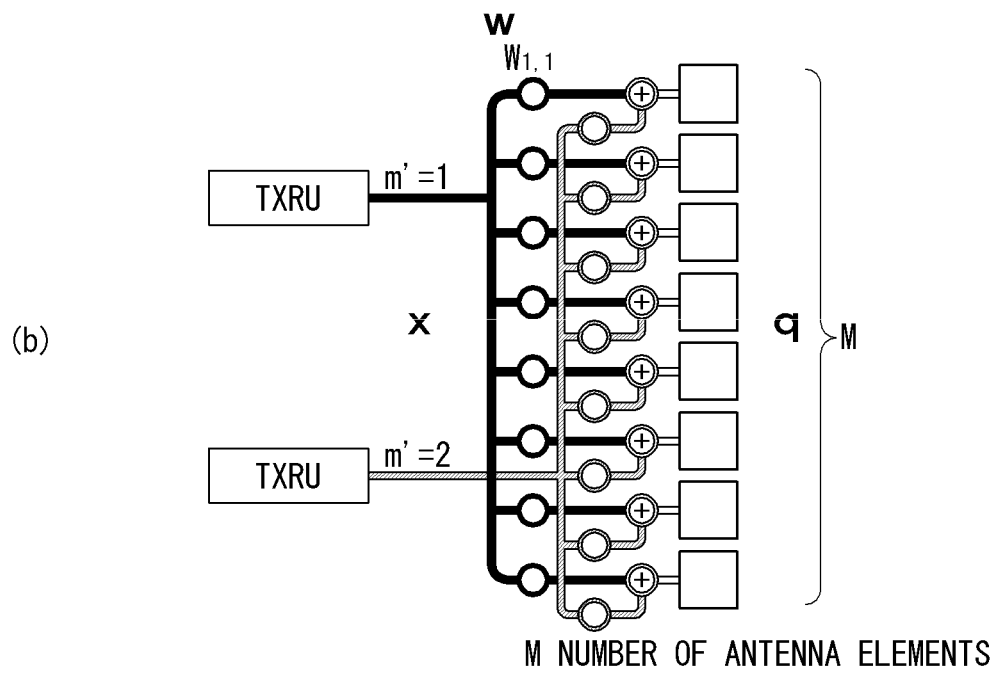
M NUMBER OF ANTENNA ELEMENTS

[Figure 6]
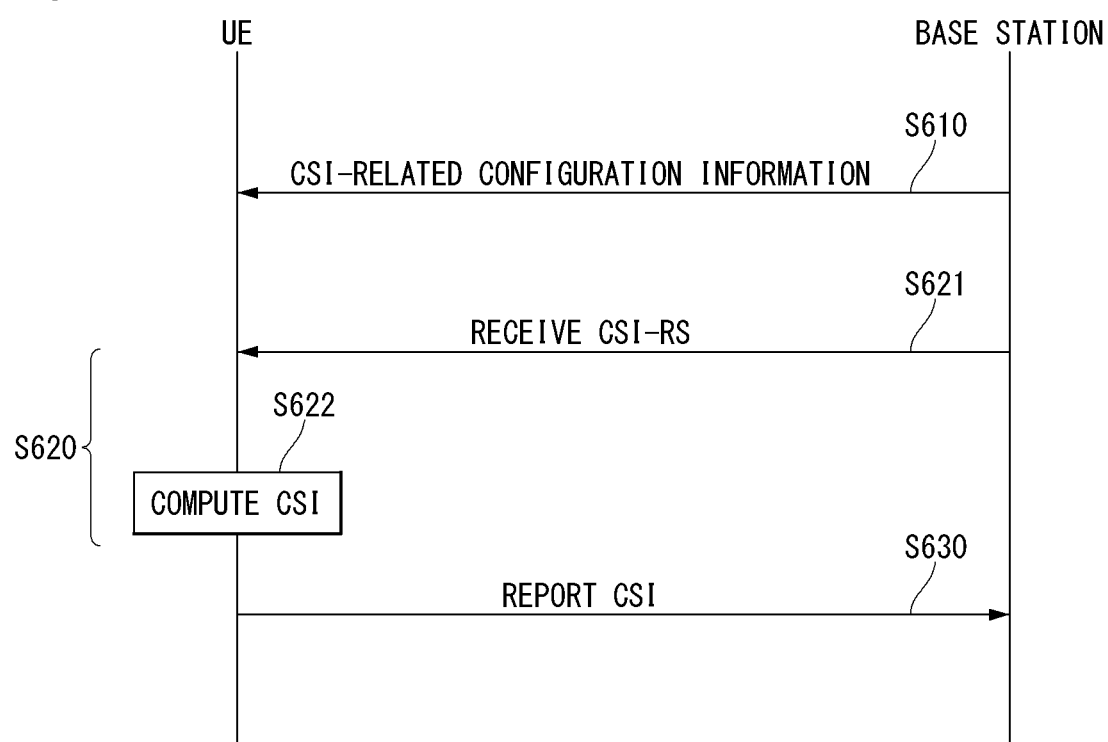

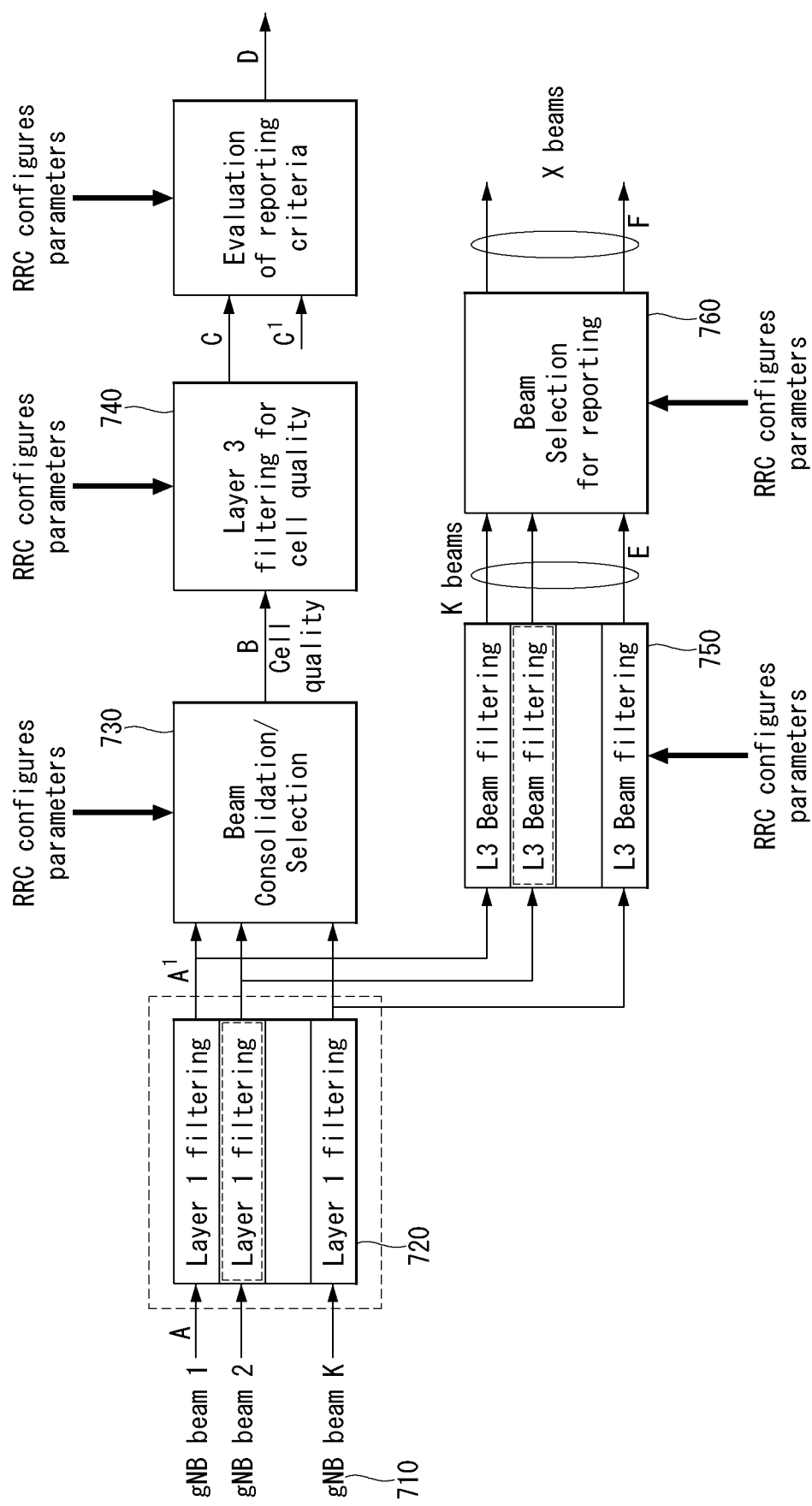

[Figure 8]
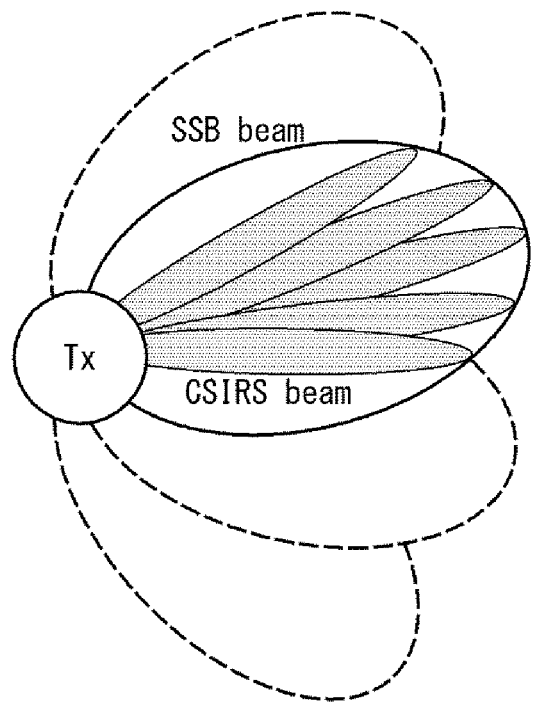
[Figure 9]
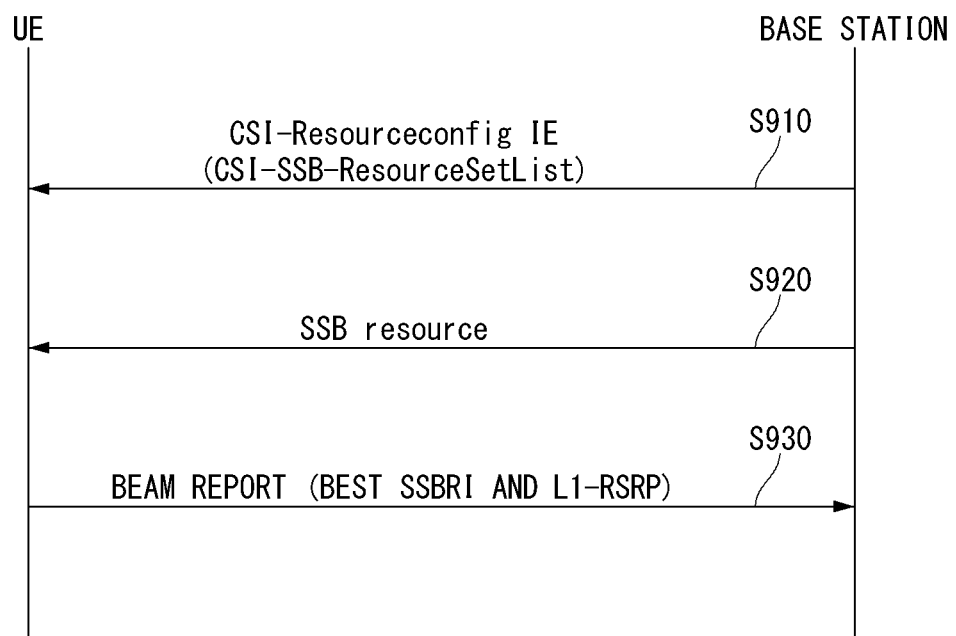

[Figure 10]
(a)
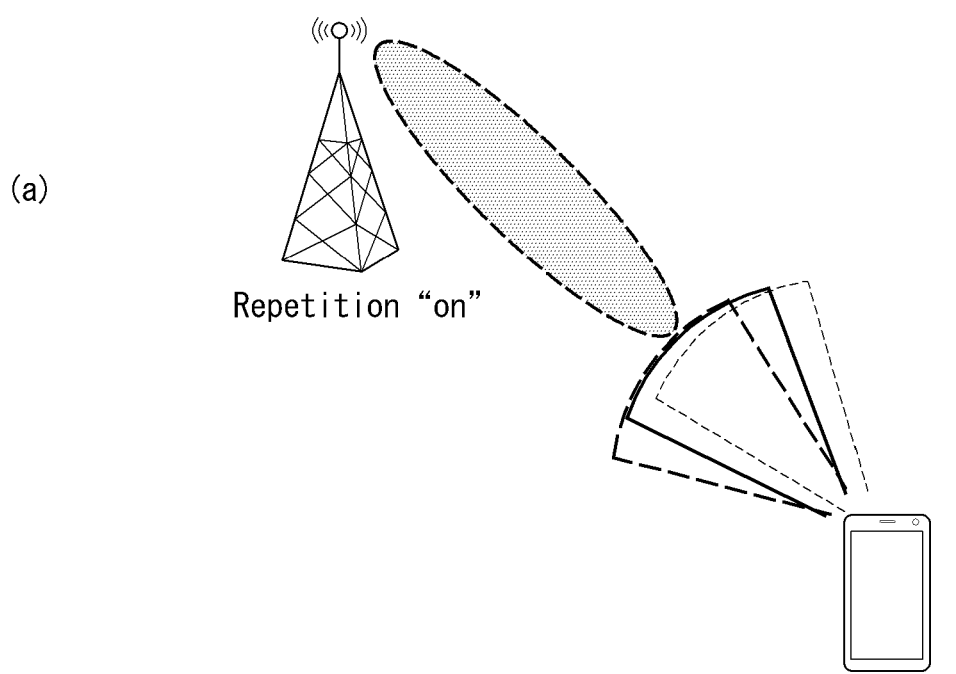
(b)
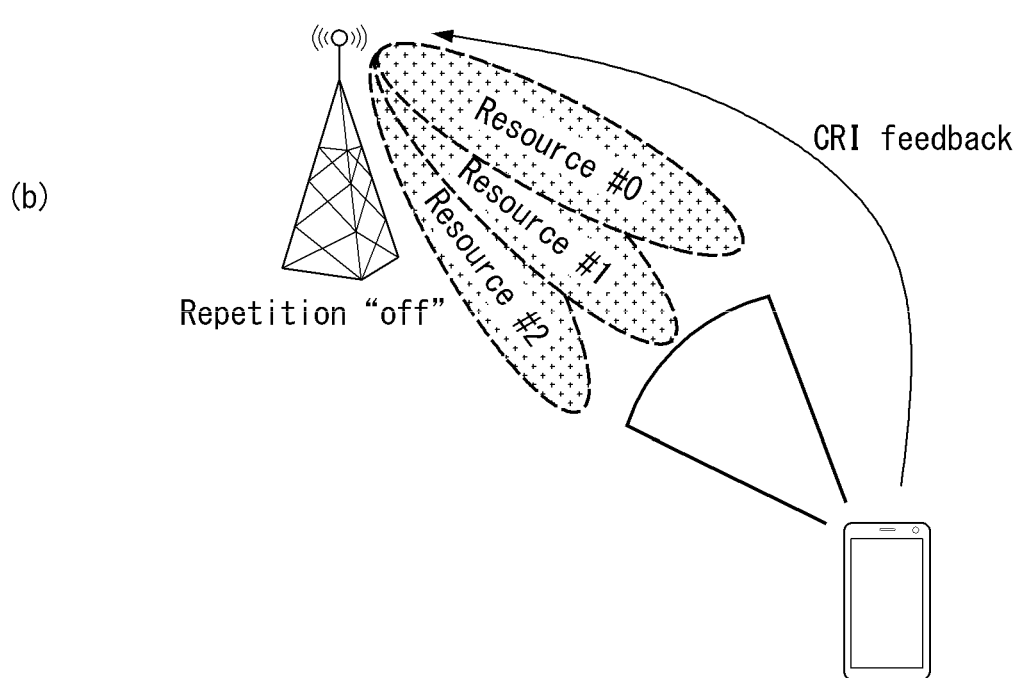

[Figure 11]
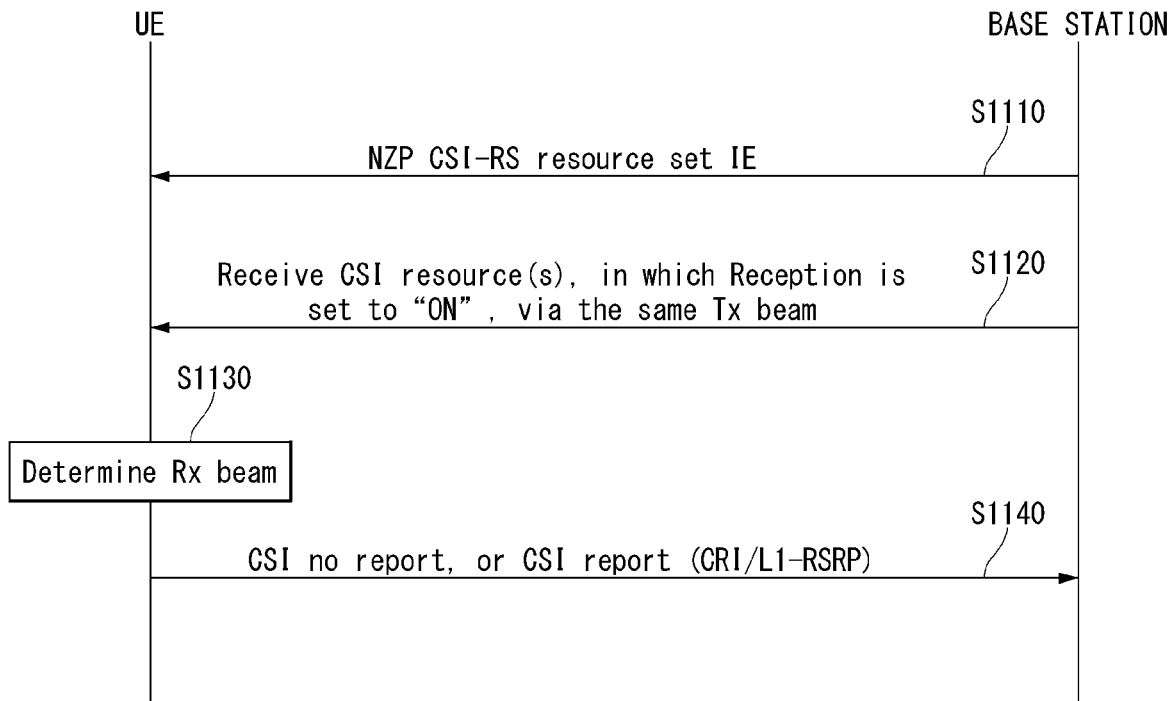
[Figure 12]
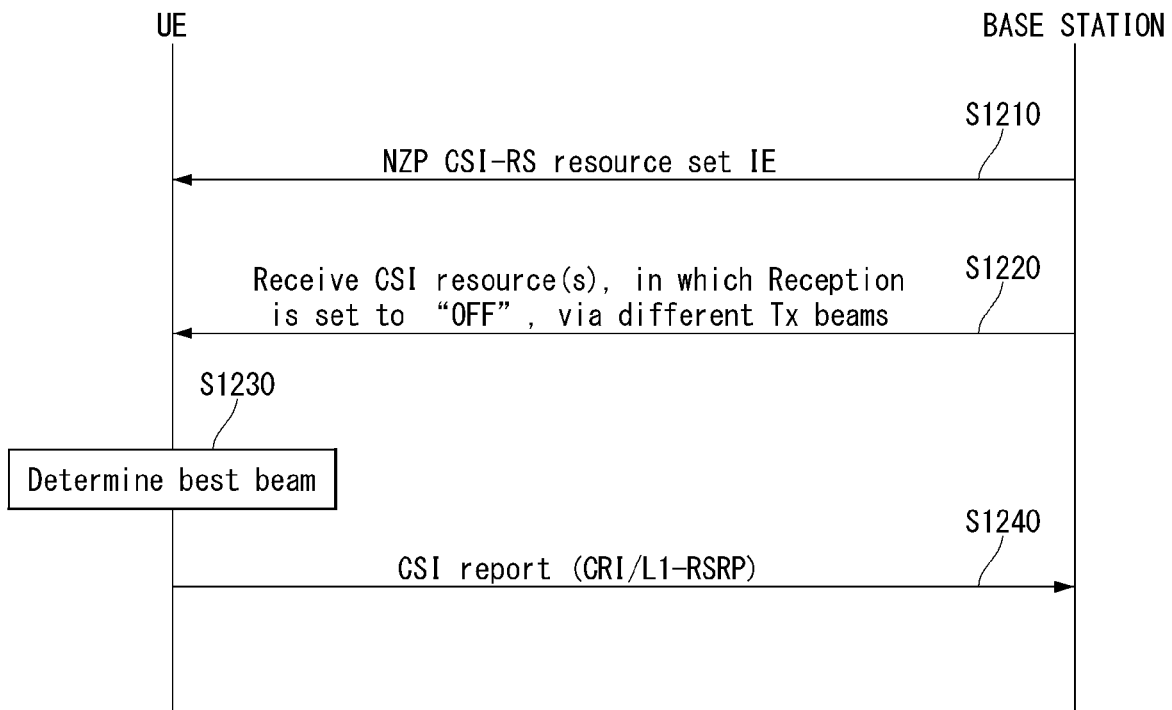

【Figure 13】
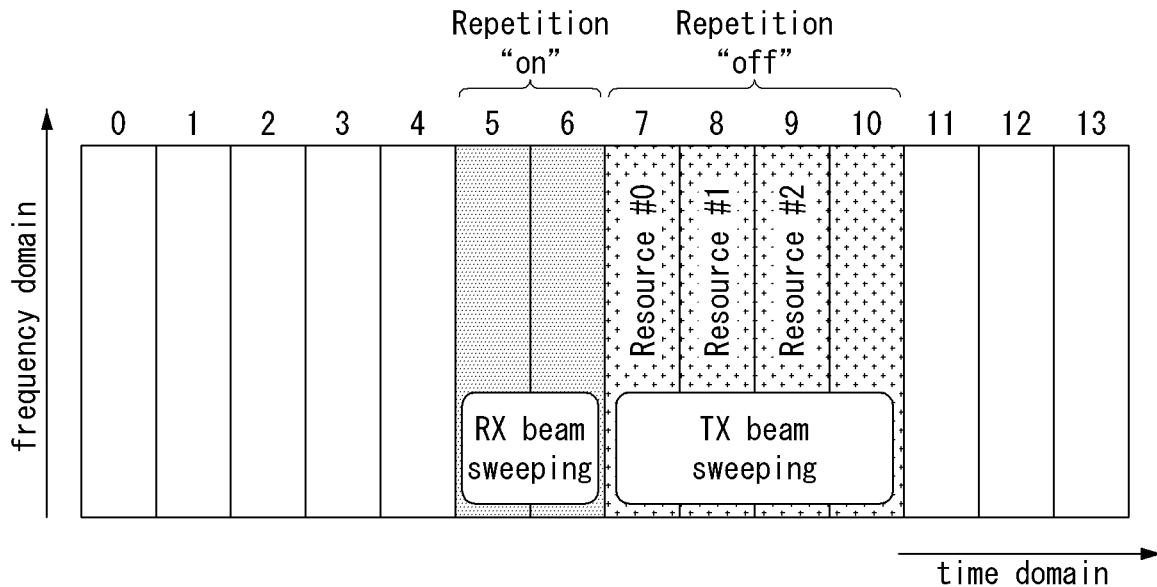
【Figure 14】
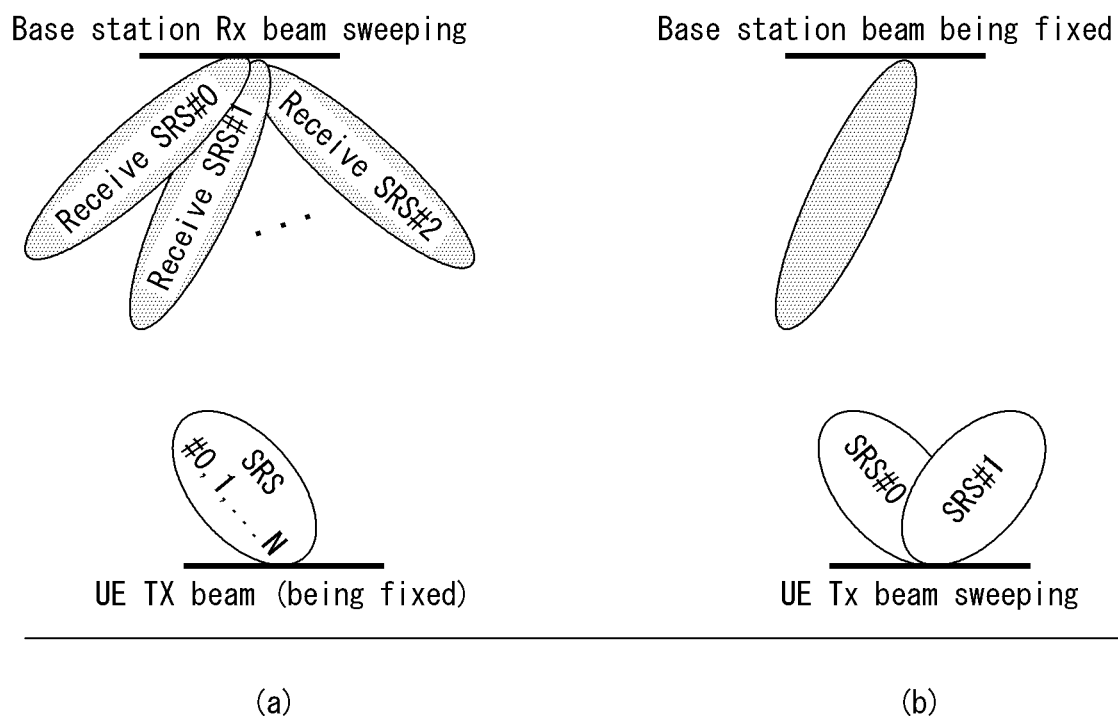
(a)  (b)

[Figure 15]
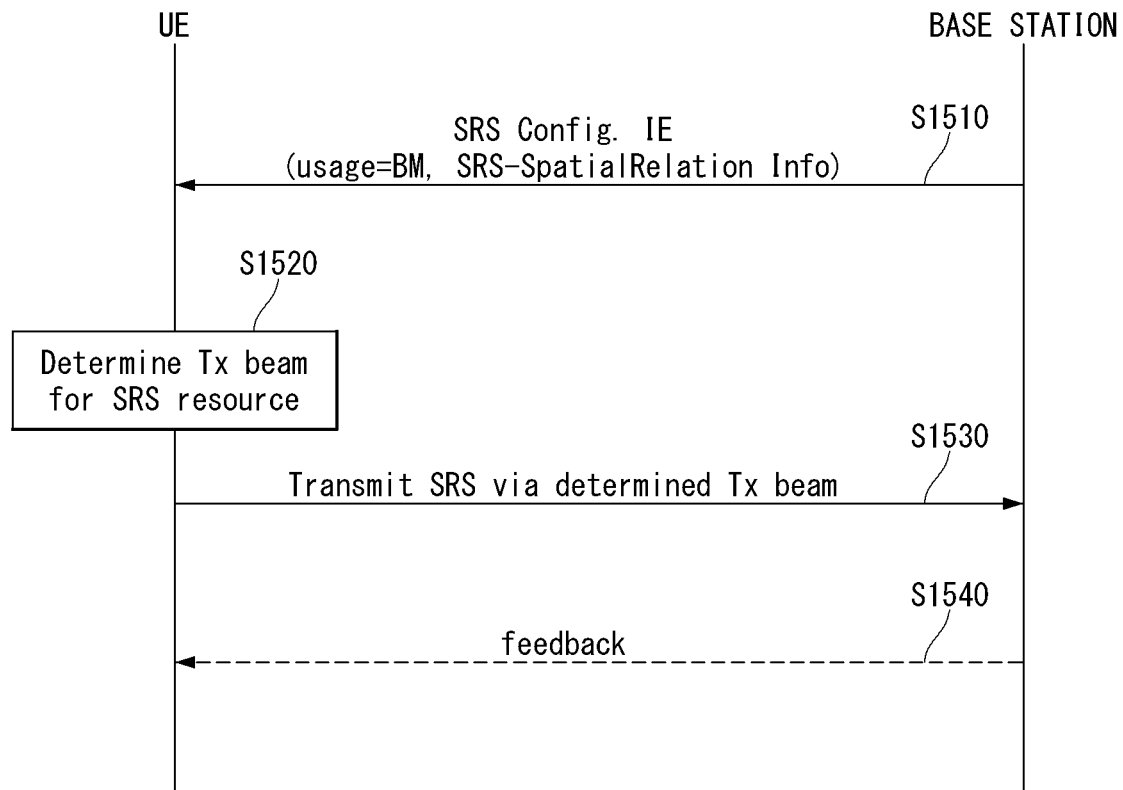
[Figure 16]
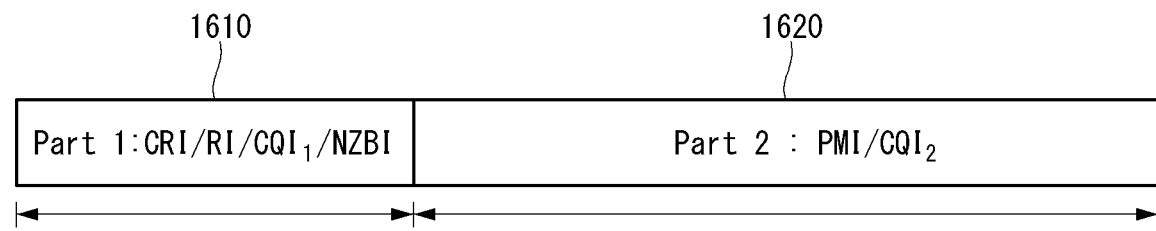

【Figure 17】
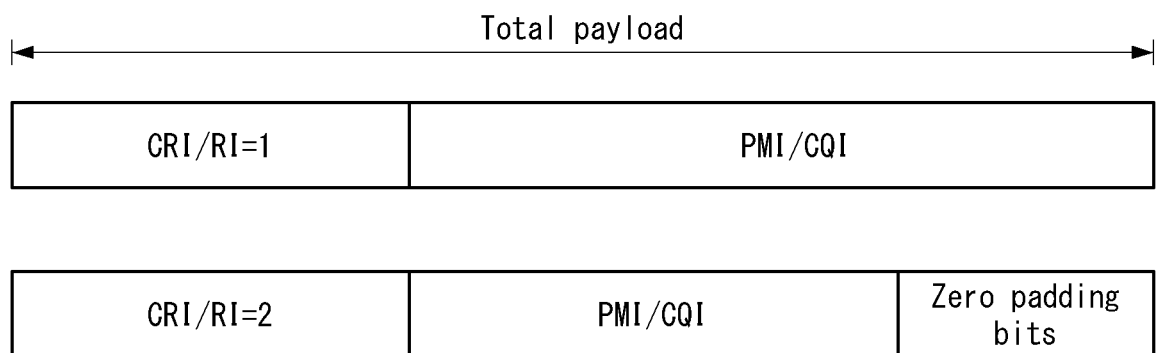
【Figure 18】
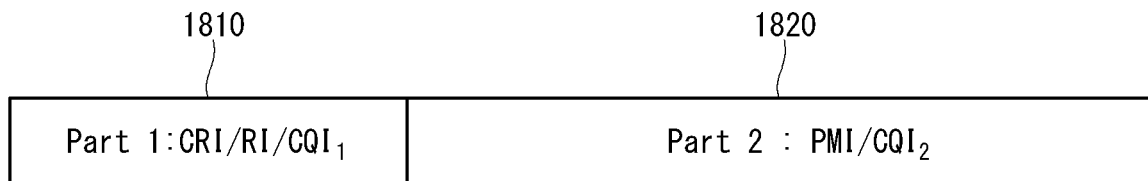

[Figure 19]
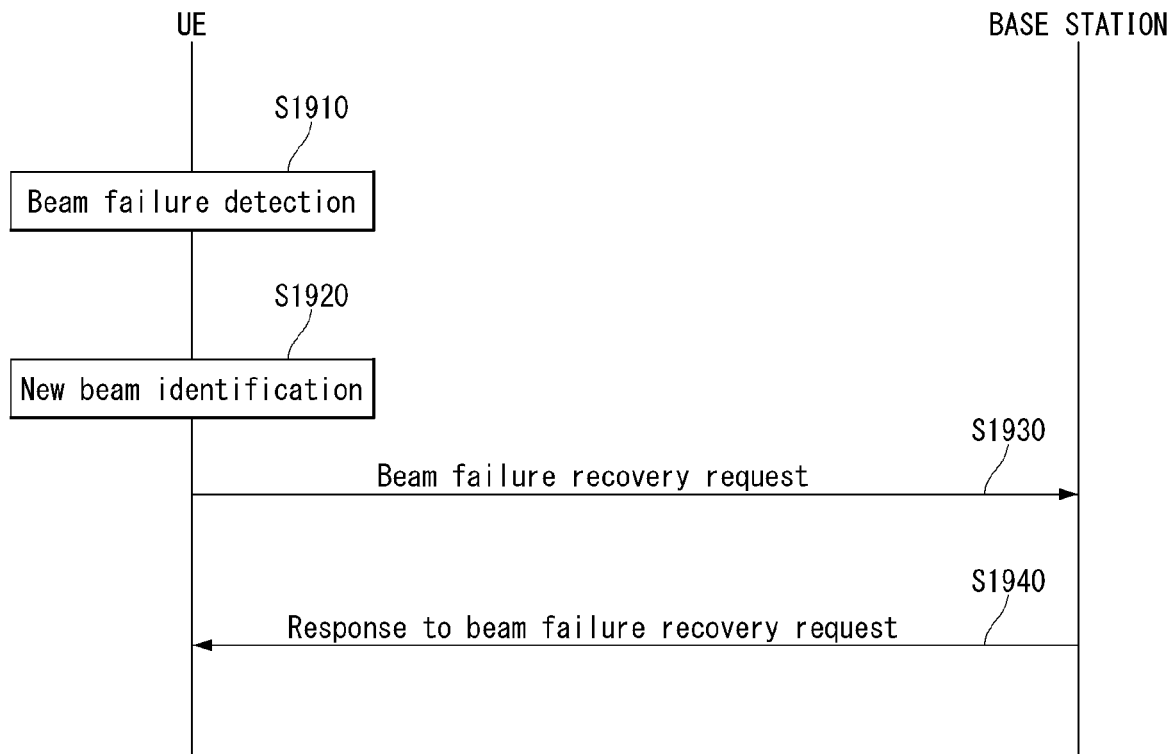
[Figure 20]
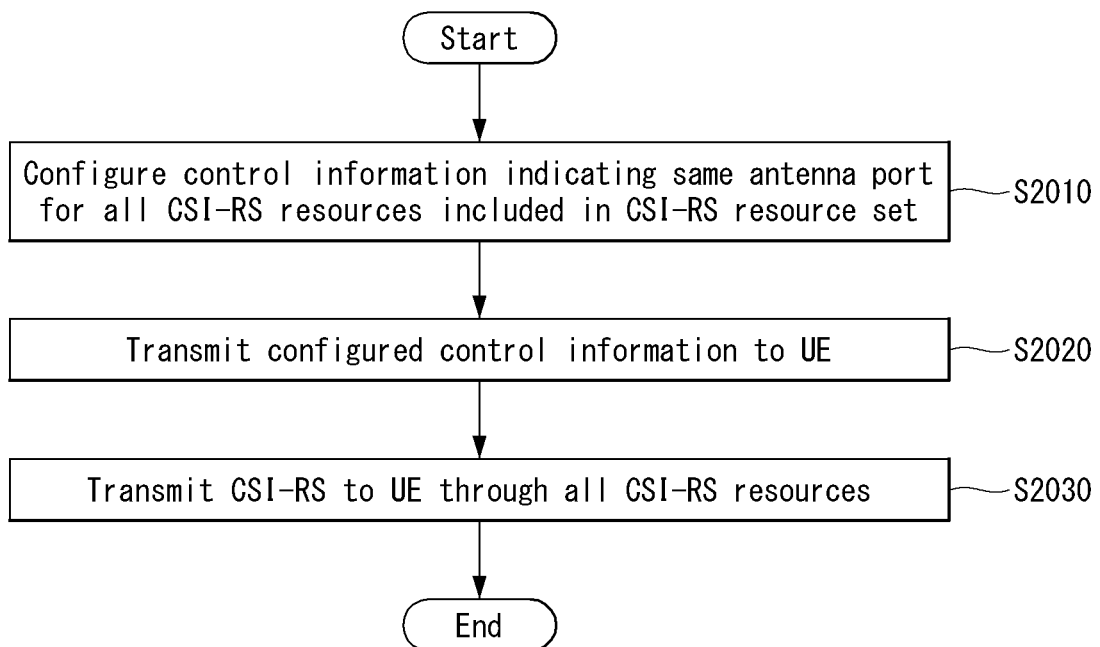

[Figure 21]
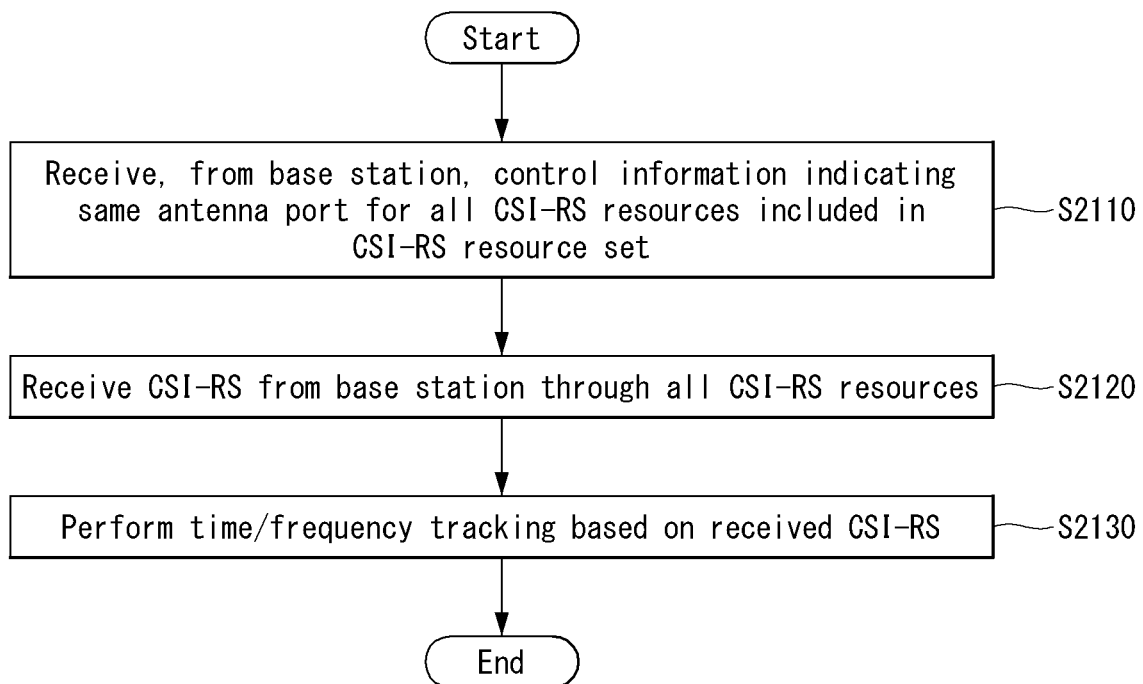
[Figure 22]
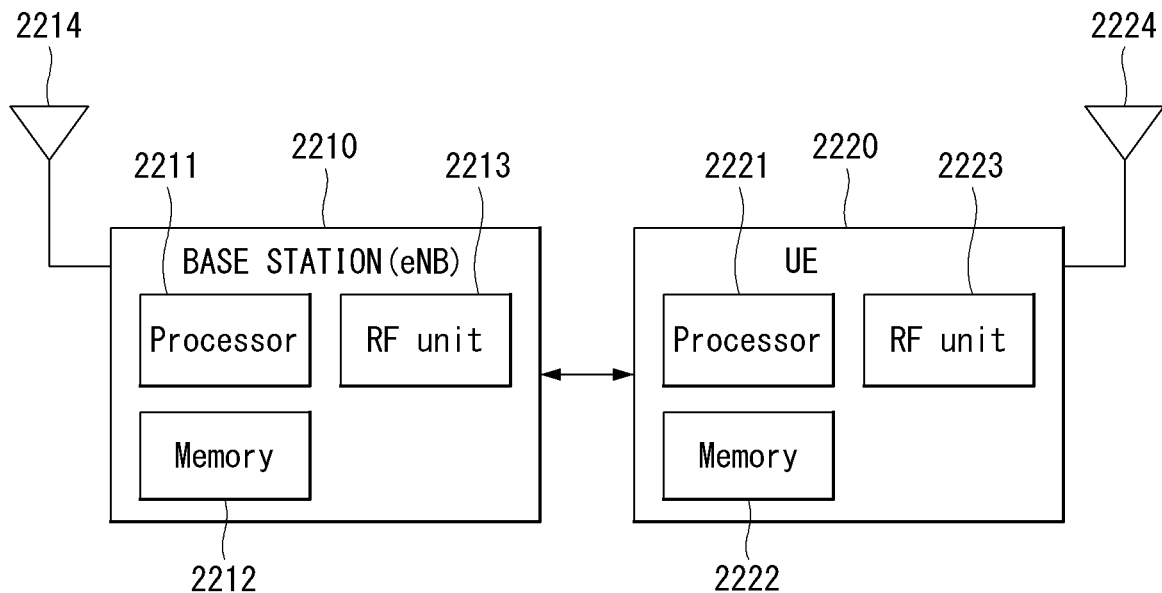

[Figure 23]
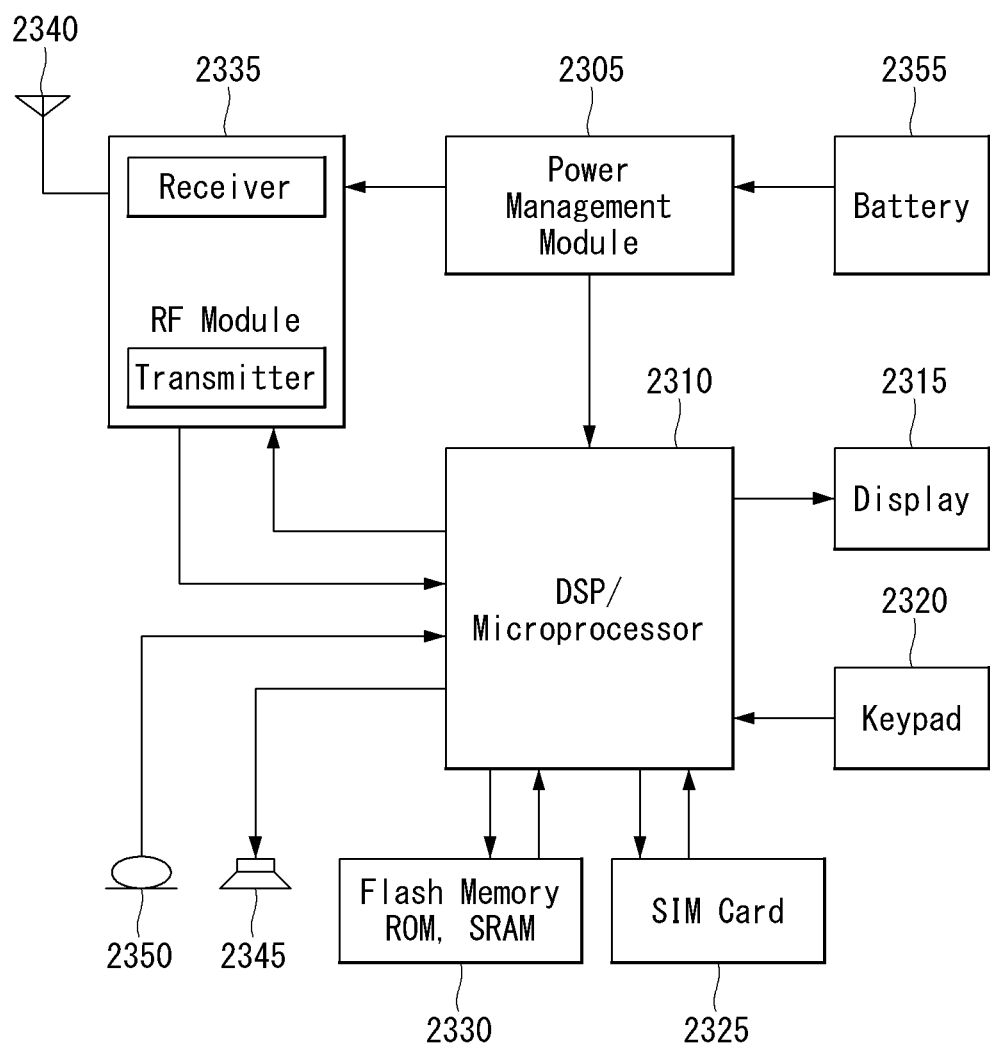

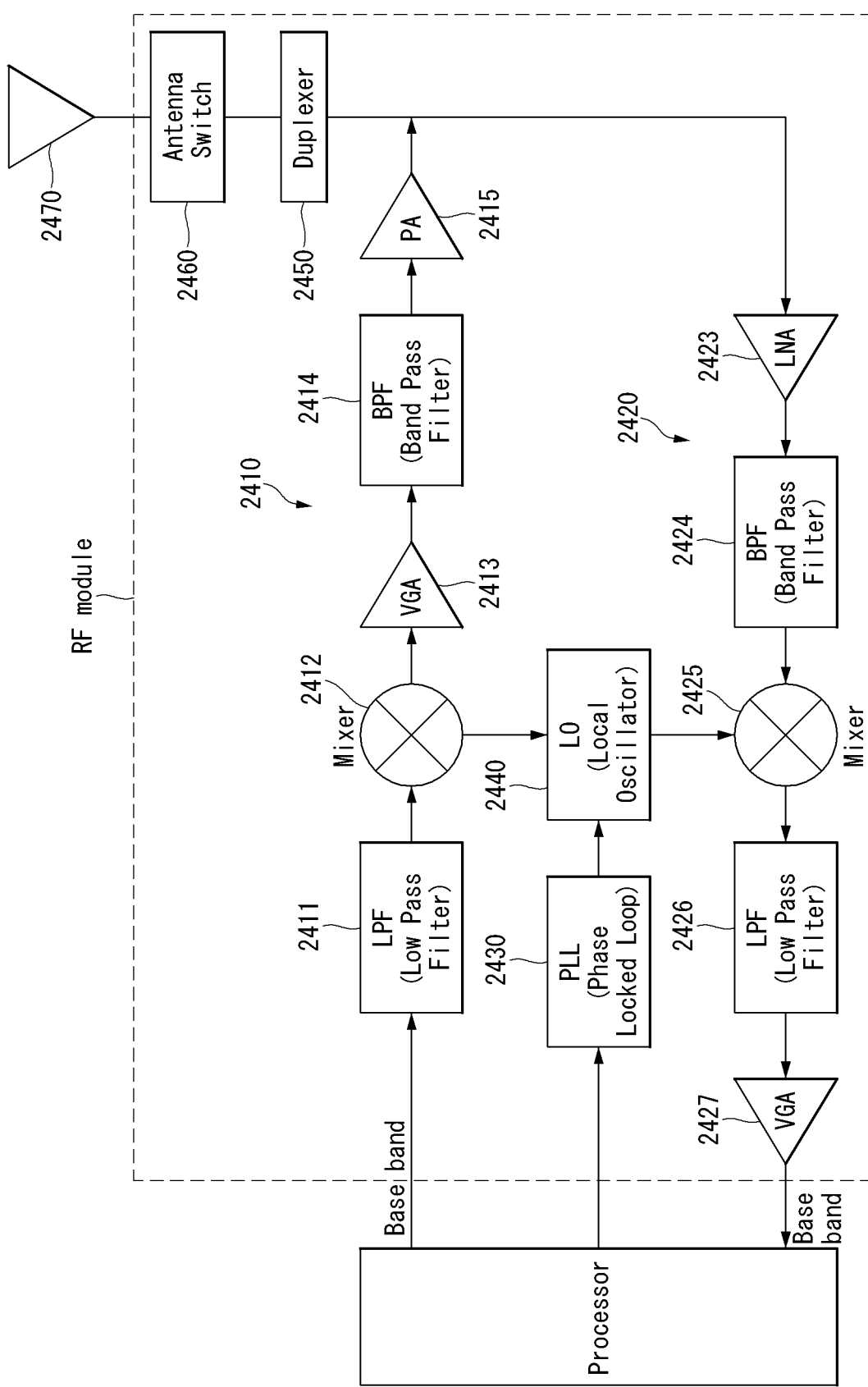
[Figure 24]

[Figure 25]
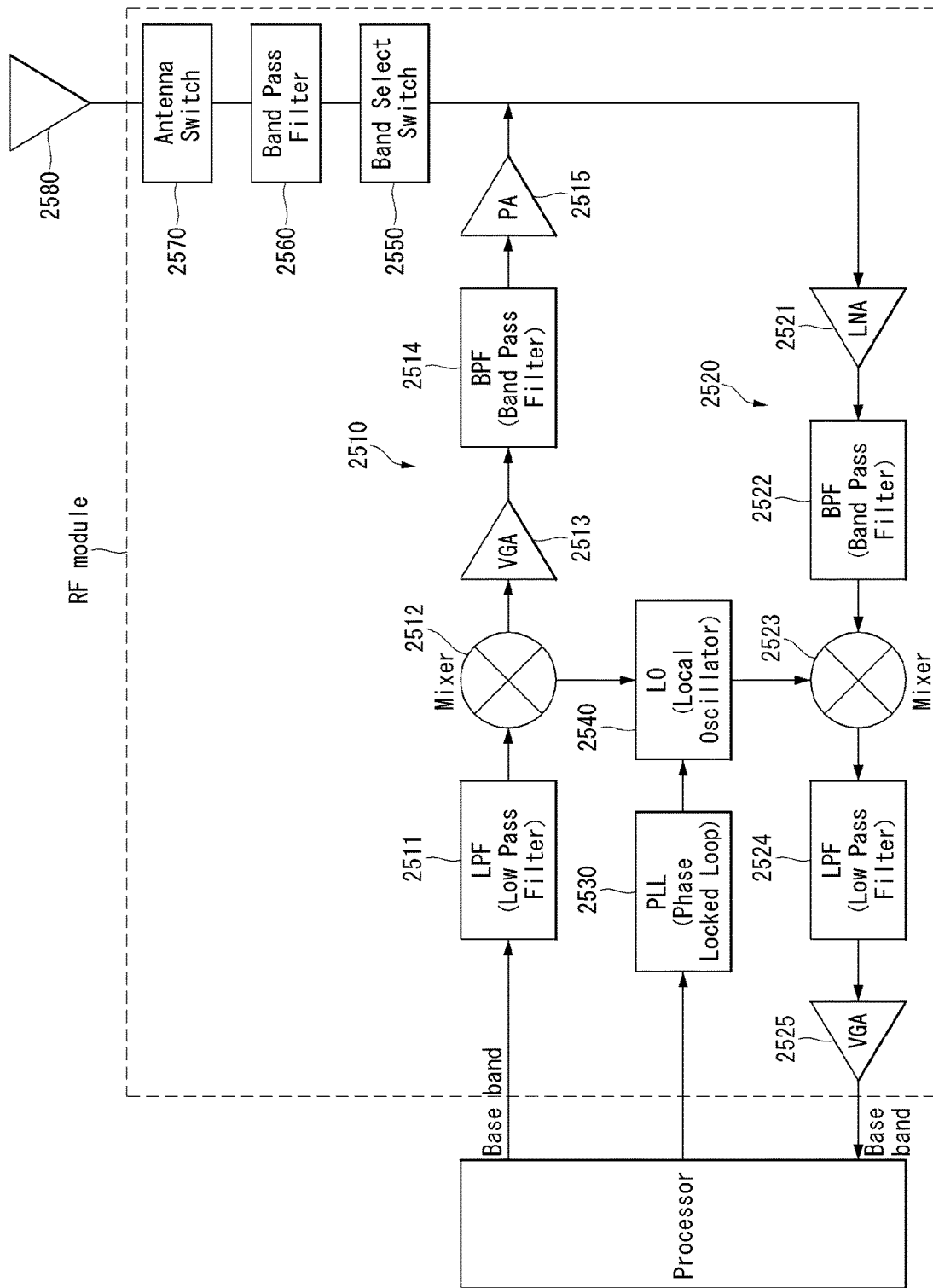

METHOD AND APPARATUS FOR TRANSMITTING AND RECEIVING CHANNEL STATE INFORMATION-REFERENCE SIGNAL (CSI-RS)

CROSS-REFERENCE TO RELATED APPLICATIONS

This application is a continuation of U.S. application Ser. No. 16/126,462, filed Sep. 10, 2018, which is a continuation of and claims priority under 35 U.S.C. § 120 to International Application No. PCT/KR2018/008296, filed on Jul. 23, 2018, which claims the benefit of U.S. Provisional Application No. 62/535,243 filed on Jul. 21, 2017, U.S. Provisional Application No. 62/541,115 filed on Aug. 4, 2017 and U.S. Provisional Application No. 62/554,586 filed on Sep. 6, 2017, the contents of which are all hereby incorporated by reference herein in their entirety.

TECHNICAL FIELD

The present disclosure relates to a wireless communication system and, more particularly, to a method for transmitting and receiving a channel state information (CSI)-reference signal (RS) and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure is to provide a method of designing a reference signal (RS) (e.g., TRS) to be used for time/frequency tracking.

The present disclosure proposes a method of explicitly or implicitly providing configuration of a TRS.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The present disclosure provides a method of transmitting and receiving a control state information (CSI)-reference signal (RS) in a wireless communication system.

Specifically, a method performed by a base station includes: configuring control information indicating that an antenna port for all CSI-RS resources included in a CSI-RS resource set is same, wherein the CSI-RS resource set is used for tracking at least one of a time or a frequency; transmitting the configured control information to a user equipment (UE); and transmitting the CSI-RS to the UE through all the CSI-RS resources.

In the present disclosure, the antenna port may be 1-port

In the present disclosure, the UE may be a UE in a radio resource control (RRC) connected state.

In the present disclosure, the CSI-RS may be a periodic CSI-RS.

In the present disclosure, all the CSI-RS resources may be configured with a same periodicity.

In the present disclosure, all the CSI-RS resources may be configured in a single slot or multiple slots.

In the present disclosure, the multiple slots may be consecutive slots.

In the present disclosure, symbol locations of all the CSI-RS resources may be different when all the CSI-RS resources are configured in the single slot.

In the present disclosure, code division multiplexing (CDM) may not be applied to all the CSI-RS resources.

In the present disclosure, a frequency domain density of each of the CSI-RS resources may be greater than 1.

In the present disclosure, the CSI-RS resource set may not be configured both for the tracking and for beam management.

In the present disclosure, a CSI-RS resource used for the tracking may be quasi co-located (QCL) with a CSI-RS resource used for CSI acquisition, a CSI-RS resource used for beam management, or an SS/PBCH block (SSB).

In the present disclosure, a time domain measurement restriction for the CSI-RS may be set to "OFF".

In the present disclosure, linkage between the CSI-RS resource set and a report setting may not be set.

In the present disclosure, linkage between the CSI-RS resource set and a specific report setting may be set.

In the present disclosure, the specific report setting may be a null reporting setting.

In the present disclosure, the method may further include receiving information related to a density of a time domain of the CSI-RS from the UE.

In the present disclosure, the time domain may be a single slot or consecutive slots.

In addition, in the present disclosure, a method for receiving a channel state information (CSI)-reference signal(RS) by a user equipment (UE) in a wireless communication system may include: receiving, from a base station, control information indicating that an antenna port for all CSI-RS resources included in a CSI-RS resource set is same, wherein the CSI-RS resource set is used for tracking at least one of a time or a frequency; receiving, from the base station, the CSI-RS through all the CSI-resources; and tracking at least one of a time or a frequency based on the received CSI-RS.

In addition, in the present disclosure, a base station which transmits a channel state information (CSI)-reference signal (RS) in a wireless communication system and includes: a radio frequency (RF) module configured to transmit and receive a wireless signal; and a processor functionally connected to the RF module and configured to: configure control information indicating that an antenna port for all CSI-RS resources included in a CSI-RS resource set is same, wherein the CSI-RS resource set is used for tracking at least one of a time or a frequency; transmit the configured control information to a user equipment (UE); and transmit the CSI-RS to the UE through all the CSI-RS resources.

Advantageous Effects

The present disclosure newly defines a tracking reference signal (TRS) so as to more precisely perform time/frequency tracking of a user equipment (UE).

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 1 is a diagram illustrating an example of an overall structure of a new radio (NR) system to which a method proposed by the present disclosure may be implemented.

FIG. 2 illustrates a relationship between a uplink (UL) frame and a downlink (DL) frame in a wireless communication system to which a method proposed by the present disclosure may be implemented.

FIG. 3 illustrates an example of a resource grid supported in a wireless communication system to which a method proposed by the present disclosure may be implemented.

FIG. 4 is a diagram illustrating an example of a self-contained subframe structure in a wireless communication system to which the present disclosure may be implemented.

FIG. 5 is an example of a transceiver unit model in a wireless communication system to which the present disclosure may be implemented.

FIG. 6 is a flowchart illustrating an example of a control state information (CSI)-related procedure.

FIG. 7 is a conceptual diagram illustrating an example of a beam-related measurement model.

FIG. 8 is a diagram illustrating a transmission (Tx) beam regarding a downlink (DL) beam management (BM) procedure.

FIG. 9 is a flowchart illustrating an example of the DL BM procedure using a synchronization signal block (SSB).

FIG. 10 is a diagram illustrating an example of a DL BM procedure using a CSI-RS.

FIG. 11 is a flowchart illustrating an example of a reception (Rx) beam determination procedure of a UE.

FIG. 12 is a flowchart illustrating an example of a Tx beam determination procedure of a base station.

FIG. 13 is a diagram illustrating an example of resource allocation related to operation of FIG. 10 in time and frequency domains.

FIG. 14 is a diagram illustrating an example of a UL BM procedure using an SRS.

FIG. 15 is a flowchart illustrating a UL BM procedure using a sounding reference symbol (SRS).

FIG. 16 shows an example of information payload of a physical uplink shared channel (PUSCH)-based CSI reporting.

FIG. 17 shows an example of information payload of a short physical uplink control channel (PUCCH)-based CSI reporting.

FIG. 18 shows an example of information payload of a long PUCCH-based CSI reporting.

FIG. 19 is a flowchart illustrating an example of a beam failure recovery (BFR) procedure.

FIG. 20 is a flowchart illustrating operation of a base station for time/frequency tracking, which is proposed in the present disclosure.

FIG. 21 is a flowchart illustrating time/frequency tracking operation of a UE which is proposed in the present disclosure.

FIG. 22 is a block diagram of a wireless communication device to which methods proposed in the present disclosure may be applied.

FIG. 23 is a block diagram of a communication device according to an embodiment of the present disclosure.

FIG. 24 is a diagram illustrating an example of an RF module of a wireless communication apparatus to which the method proposed in the present disclosure may be applied.

FIG. 25 is a diagram illustrating another example of an radio frequency (RF) module of a wireless communication apparatus to which the method proposed in the present disclosure may be applied.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical spirit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N or μ. In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of Ts=1/(Δf max·Nf). In this case, Δf max=480·10^3, and Nf=4096. DL and UL transmission is configured as a radio frame having a section of Tf=(Δf max Nf/100)·Ts=100 ms. The radio frame is composed of ten subframes each having a section of Tsf=(Δf max Nf/1000)·Ts=1 ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted T_TA=N_TA·T_s before the start of a corresponding DL frame in the UE.

Regarding the numerology μ, slots are numbered in ascending order of n^μ_s∈{0, . . . , N^slot,μ_subframe−1} in a subframe, and in ascending order of n^μ_s, f∈{0, . . . , N^slot,μ_frame−1} in a radio frame. One slot is composed of continuous OFDM symbols of N^μ_symb, and N^μ_symb is determined depending on a numerology in use and slot configuration. The start of slot N^μ_s in a subframe is temporally aligned with the start of OFDM symbols $N^{\mu}\_s \cdot N^{\mu}\_symb$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | | 0 | | | 1 | |
| μ | $N^{\mu}\_symb$ | $N^{\mu}\_slot, \mu\_frame$ | $N^{\mu}\_symb$ | $N^{\mu}\_symb$ | $N^{\mu}\_symb$ | $N^{\mu}\_slot, \mu\_subframe$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | | 0 | | | 1 | |
| μ | $N^{\mu}\_symb$ | $N^{\mu}\_slot, \mu\_frame$ | $N^{\mu}\_symb$ | $N^{\mu}\_symb$ | $N^{\mu}\_symb$ | $N^{\mu}\_slot, \mu\_subframe$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N^{\mu}\_RB \cdot N^{\mu}RB\_SC$ subcarriers in a frequency domain, each subframe composed of $14 \cdot 2\mu$ OFDM symbols, but the present disclosure is not limited thereto.

In the NR system, a transmitted signal is described by one or more resource grids, composed of $N^{\mu}\_RB \cdot N^{\mu}RB\_SC$ subcarriers, and $2^{\mu} \cdot N^{\mu}(\mu)\_symb$ OFDM symbols Herein, $N^{\mu}\_RB <= N^{\mu}max, \mu\_RB$. The above $N^{\mu}max,\mu\_RB$-indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k, ĺ). Herein, $k=0, \ldots, N^{\mu}\_RB \cdot N^{\mu}RB\_SC-1$ is an index in the frequency domain, and $\bar{l}=0, \ldots, 2^{\mu} \cdot N^{\mu}(\mu)\_symb-1$ indicates a location of a symbol in a subframe. To indicate a resource element in a slot, the index pair (k, ĺ) is used. Herein, $l=0, \ldots, N^{\mu}\_symb-1$.

The resource element (k, ĺ) for the numerology μ and the antenna port p corresponds to a complex value $a^{(p,u)}\_{k,\bar{l}}$. When there is no risk of confusion or when a specific antenna port or numerology is specified, the indexes p and μ may be dropped and thereby the complex value may become $a^{(p)}\_{k,\bar{l}}$ or $a\_{k,\bar{l}}$.

In addition, a physical resource block is defined as $N^{\mu}RB\_SC=12$ continuous subcarriers in the frequency domain. In the frequency domain, physical resource blocks may be numbered from 0 to $N^{\mu}\_RB-1$. At this point, a relationship between the physical resource block number n_PRB and the resource elements (k,l) may be given as in Equation 1.

$$n\_PRB = [k/N^{\mu}RB\_SC] \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N^{\mu}\_URB-1$ in the frequency region.

Self-Contained Subframe Structure

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non-shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Channel State Information (CSI) Feedback

In most cellular systems including an LTE system, a UE receives a pilot signal (or a reference signal) for estimating a channel from a base station, calculate channel state information (CSI), and reports the CSI to the base station.

The base station transmits a data signal based on the CSI information fed back from the UE.

The CSI information fed back from the UE in the LTE system includes channel quality information (CQI), a precoding matrix index (PMI), and a rank indicator (RI).

CQI feedback is wireless channel quality information which is provided to the base station for a purpose (link adaptation purpose) of providing a guidance as to which modulation & coding scheme (MCS) to be applied when the base station transmits data.

In the case where there is a high wireless quality of communication between the base station and the UE, the UE may feed back a high CQI value and the base station may transmit data by applying a relatively high modulation order and a low channel coding rate. In the opposite case, the UE may feed back a low CQI value and the base station may transmit data by applying a relatively low modulation order and a high channel coding rate.

PMI feedback is preferred precoding matrix information which is provided to a base station in order to provide a guidance as to which MIMO precoding scheme is to be applied when the base station has installed multiple antennas.

A UE estimates a downlink MIMO channel between the base station and the UE from a pilot signal, and recommends, through PMI feedback, which MIMO precoding is desired to be applied by the base station.

In the LTE system, only linear MIMO precoding capable of expressing PMI configuration in a matrix form is considered.

The base station and the UE share a codebook composed of a plurality of precoding matrixes, and each MIMO precoding matrix in the codebook has a unique index.

Accordingly, by feeding back an index corresponding to the most preferred MIMO precoding matrix in the codebook as PMI, the UE minimizes an amount of feedback information thereof.

A PMI value is not necessarily composed of one index. For example, in the case where there are eight transmitter antenna ports in the LTE system, a final 8tx MIMO precoding matrix may be derived only when two indexes (first PMI & second PMI) are combined.

RI feedback is information on the number of preferred transmission layers, the information which is provided to the base station in order to provide a guidance as to the number of the UE's preferred transmission layers when the base station and the UE have installed multiple antennas to thereby enable multi-layer transmission through spatial multiplexing.

The RI and the PMI are very closely correlated to each other. It is because the base station is able to know which precoding needs to be applied to which layer depending on the number of transmission layers.

Regarding configuration of PMI/RM feedback, a PMI codebook may be configured with respect to single layer transmission and then PMI may be defined for each layer and fed back, but this method has a disadvantage that an amount of PMI/RI feedback information increases remarkably in accordance with an increase in the number of transmission layers.

Accordingly, in the LTE system, a PMI codebook is defined depending on the number of transmission layers. That is, for R-layer transmission, N number of Nt×R matrixes are defined (herein, R represents the number of layers, Nt represents the number of transmitter antenna ports, and N represents the size of the codebook).

Accordingly, in LTE, a size of a PMI codebook is defined irrespective of the number of transmission layers. As a result, since PMI/RI is defined in this structure, the number of transmission layers (R) conforms to a rank value of the precoding matrix (Nt×R matrix), and, for this reason, the term "rank indicator(RI)" is used.

Unlike PMI/RI in the LTE system, PMI/RI described in the present disclosure is not restricted to mean an index value of a precoding matrix Nt×R and a rank value of the precoding matrix.

PMI described in the present disclosure indicates information on a preferred MINO precoder from among MIMO precoders capable of being applied by a transmitter, and a form of the precoder is not limited to a linear precoder which is able to be expressed in a matrix form, unlike in the LTE system. In addition, RI described in the present disclosure means wider than RO in LTE and includes feedback information indicating the number of preferred transmission layers.

The CSI information may be obtained in all system frequency domains or in some of the frequency domains. In particular, in a broad bandwidth system, it may be useful to obtain CSI information on some frequency domains (e.g., subband) preferred by each UE and then feedback the obtained CSI information.

In the LTE system, CSI feedback is performed via an UL channel, and, in general, periodic CSI feedback is performed via a physical uplink control channel (PUCCH) and aperiodic CSI feedback is performed via physical uplink shared channel (PUSCH) which is a UL data channel.

The aperiodic CSI feedback means temporarily transmitting a feedback only when a base station needs CSI feedback information, and the base station triggers the CSI feedback via a DL control channel such as a PDCCH/ePDCCH.

In the LTE system, which information a UE needs to feedback in response to triggering of CSI feedback is defined as a PUSCH CSI reporting mode, as shown in FIG. 8, and a PUSCH CSI reporting mode in which the UE needs to operate is informed for the UE in advance via a higher layer message.

Channel State Information (CSI)-Related Procedure

In the new radio (NR) system, a channel state information-reference signal (CSI-RS) is used for time/frequency tracking, CSI computation, layer 1(L1)-reference signal received power (RSRP) computation, or mobility Throughout the present disclosure, "A and/or B" may be interpreted as the same as "including at least one of A or B".

The CSI computation is related to CSI acquisition, and L1-RSRP computation is related to beam management (BM).

The CSI indicates all types of information indicative of a quality of a radio channel (or link) formed between a UE and an antenna port.

Hereinafter, operation of a UE with respect to the CSI-related procedure will be described.

FIG. 6 is a flowchart illustrating an example of a CSI-related procedure.

To perform one of the above purposes of a CSI-RS, a terminal (e.g., a UE) receives CSI related configuration information from a base station (e.g., a general node B (gNB)) through a radio resource control (RRC) signaling (S610).

The CSI-related configuration information may include at least one of CSI interference management (IM) resource-related information, CSI measurement configuration-related information, CSI resource configuration-related information, CSI-RS resource-related information, or CSI report configuration-related information.

The CSIIM resource-related information may include CSI-IM resource information, CSI-IM resource set information, etc.

The CSI-IM resource set is identified by a CSI-IM resource set ID (identifier), and one resource set includes at least one CSI-IM resource.

Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set.

That is, the CSI resource configuration-related information includes a CSI-RS resource set list, and the CSI-RS resource set list may include at least one of a NZP CSI-RS resource set list, a CSI-IM resource set list, or a CSI-SSB resource set list.

The CSI resource configuration-related information may be expressed as CSI-REsourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 4, parameters (e.g.: the BM-related parameter repetition, and the tracking-related parameter trs-Info indicative of(or indicating) a purpose of a CSI-RS may be set for each NZP CSI-RS resource set.

Table 4 shows an example of NZP CSI-RS resource set IE.

TABLE 4

-- ASN1START
-- TAG-NZP-CSI-RS-RESOURCESET-START
NZP-CSI-RS-ResourceSet ::=    SEQUENCE {

TABLE 4-continued

```
    nzp-CSI-ResourceSetId      NZP-CSI-RS-ResourceSetId,
    nzp-CSI-RS-Resources       SEQUENCE (SIZE (1..maxNrofNZP-CSI-RS-ResourcesPerSet)) OF
                               NZP-CSI-RS-ResourceId,
      repetition                 ENUMERATED { on,
off }                                                 OPTIONAL,
    aperiodicTriggeringOffset  INTEGER(0..4)
        OPTIONAL, -- Need S
    trs-Info                   ENUMERATED
{true}                                                OPTIONAL, -- Need R
    ...
}
-- TAG-NZP-CSI-RS-RESOURCESET-STOP
-- ASN1STOP
```

In Table 4, the parameter repetition is a parameter indicative of whether to repeatedly transmit the same beam, and indicates whether repetition is set to "ON" or "OFF" for each NZP CSI-RS resource set.

The term "transmission (Tx) beam" used in the present disclosure may be interpreted as the same as a spatial domain transmission filter, and the term "reception (Rx) beam" used in the present disclosure may be interpreted as the same as a spatial domain reception filter.

For example, when the parameter repetition in Table 4 is set to "OFF", a UE does not assume that a NZP CSI-RS resource(s) in a resource set is transmitted to the same DL spatial domain transmission filter and the same Nrofports in all symbols.

In addition, the parameter repetition corresponding to a higher layer parameter corresponds to "CSI-RS-ResourceRep" of L1 parameter.

The CSI report configuration related information includes the parameter reportConfigType indicative of a time domain behavior and the parameter reportQuantity indicative of a CSI-related quantity to be reported.

The time domain behavior may be periodic, aperiodic, or semi-persistent.

In addition, the CSI report configuration-related information may be represented as CSI-ReportConfig IE, and Table 5 shows an example of the CSI-ReportConfig IE.

TABLE 5

```
-- ASN1START
-- TAG-CSI-RESOURCECONFIG-START
CSI-ReportConfig ::=                    SEQUENCE {
    reportConfigId                          CSI-ReportConfigId,
    carrier                                 ServCellIndex                 OPTIONAL, -- Need S
    resourcesForChannelMeasurement          CSI-ResourceConfigId,
    csi-IM-ResourcesForInterference         CSI-ResourceConfigId    OPTIONAL, -- Need R
    nzp-CSI-RS-ResourcesForInterference     CSI-ResourceConfigId    OPTIONAL,     -- Need R
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUSCH                   SEQUENCE {
            reportSlotConfig                        ENUMERATED (sl5, sl10, sl20, sl40, sl80, sl160, sl320),
            reportSlotOffsetList                    SEQUENCE (SIZE (1.. maxNrofUL-Allocations)) OF INTEGER(0..32),
            p0alpha                                 P0-PUSCH-AlphaSetId
        },
        aperiodic                               SEQUENCE {
            reportSlotOffsetList                    SEQUENCE (SIZE (1..maxNrofUL-Allocations)) OF INTEGER(0..32)
        }
    },
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}      OPTIONAL
        },
        cri-RI-CQI                              NULL,
        cri-RSRP                                NULL,
        ssb-Index-RSRP                          NULL,
        cri-RI-LI-PMI-CQI                       NULL
    },
```

In addition, the UE measures CSI based on configuration information related to the CSI (S620).

Measuring the CSI may include (1) receiving a CSI-RS by the UE (S621) and (2) computing CSI based on the received CSI-RS (S622).

A sequence for the CSI-RS is generated by Equation 2, and an initialization value of a pseudo-random sequence C(i) is defined by Equation 3.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

$$c_{init} = (2^{10}(N_{symb}^{slot}n_{s,f}^{\mu} + l + 1)(2n_{ID} + 1) + n_{ID})\text{mod}2^{31} \quad \text{[Equation 3]}$$

In Equations 2 and 3, $n_{s,f}^{\mu}$ is a slot number within a radio frame, and a pseudo-random sequence generator is initialized with Cint at the start of each OFDM symbol where $n_{s,f}^{\mu}$ is the slot number within a radio frame.

In addition, l indicates an OFDM symbol number in a slot, and indicates higher-layer parameter scramblingID.

In addition, regarding the CSI-RS, resource element (RE) mapping of CSI-RS resources of the CSI-RS is performed in time and frequency domains by higher layer parameter CSI-RS-ResourceMapping.

Table 6 shows an example of CSI-RS-ResourceMapping IE.

To put it briefly, when repetition is set to "ON" and "OFF", a CSI report may indicate any one of "No report", "SSB Resource Indicator (SSBRI) and L1-RSRP", and "CSI-RS Resource Indicator (CRI) and L1-RSRP".

Alternatively, it may be defined to transmit a CSI report indicative of "SSBRI and L1-RSRP" or "CRI and L1-RSRP" when repetition is set to "OFF", it may be defined such that, and to transmit a CSI report indicative of "No report", "SSBRI and L1-RSRP", or "CRI and L1-RSRP" when repetition is "ON".

Beam Management (BM) Procedure

Beam management (BM) defined in New Radio (NR) will be described.

BM procedures are layer 1(L1)/layer 2(L2) procedures for acquiring and maintaining a set of beams from a base station (e.g. a gNB, TRP, etc.) and/or a terminal (e.g., a UE) to be used for DL and UL transmission/reception, and the BM procedures may include the following procedures and terms.

Beam measurement: An operation of measuring properties of a received beam forming signal by a base station or a UE Beam determination: An operation of selecting its own transmission (Tx) beam/reception (Rx) beam by a base station or a UE Beam sweeping: An operation of covering a spatial domain using a Tx/Rx beam for a predetermined time interval in a predetermined method

TABLE 6

```
-- ASN1START
-- TAG-CSI-RS-RESOURCEMAPPING-START
CSI-RS-ResourceMapping ::=       SEQUENCE {
    frequencyDomainAllocation        CHOICE {
        row1                             BIT STRING (SIZE (4)),
        row2                             BIT STRING (SIZE (12)),
        row4                             BIT STRING (SIZE (3)),
        other                            BIT STRING (SIZE (6))
    },
    nrofPorts                        ENUMERATED {p1,p2,p4,p8,p12,p16,p24,p32},
    firstOFDMSymbolInTimeDomain      INTEGER (0..13),
    firstOFDMSymbolInTimeDomain2     INTEGER
(2..12)                                  OPTIONAL,  -- Need R
    cdm-Type                         ENUMERATED {noCDM, fd-CDM2, cdm4-FD2-TD2, cdm8-FD2-
TD4},
    density                          CHOICE {
        dot5                             ENUMERATED {evenPRBs, oddPRBs},
        one                              NULL,
        three                            NULL,
        spare                            NULL
    },
    freqBand                         CSI-FrequencyOccupation,
    ...
}
```

In Table 6, a density (D) indicates a density of CSI-RS resources measured in a RE/port/physical resource block (PRB), and nrofPorts indicates the number of antenna ports.

In addition, the UE reports the measured CSI to the base station (S630).

Herein, when a quantity of CSI-ReportConfig in Table 6 is set to "none(or No report)", the UE may skip the reporting.

However, even when the quantity is set to "none(or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

Beam report: An operation of reporting information of a beam-formed signal by a UE based on beam measurement FIG. 7 is a conceptual diagram illustrating an example of a beam-related measurement model.

For beam measurement, an SS block (or an SS/PBCH block (SSB)) or a CRI-RS is used in DL, and an sounding reference signal (SRS) is used in UL.

In RRC-CONNECTED, a UE may measure a plurality of beams (at least one beam) in a cell, and the UE may average the measurements (RSRP, RSRQ, SINR, etc.) to derive a cell quality.

In doing so, the UE may be configured to consider a sub-set of a detected beam(s).

Beam measurement-related filtering is performed at two different levels (at the physical layer which induces a beam quality and at the RRC level which induces a cell quality from multiple beams).

The cell quality may be induced from the beam measurements in the same manner with respect to both of a cell quality of a serving cell (s) and a cell quality of a non-serving cell(s).

If the UE is configured by the gNB to report a measurement of a specific beam(s), a measurement report includes measurements of X number of best beams. The beam measurement may be reported as L1-RSRP.

In FIG. 7, K number of beams (gNB beam 1, gNB beam 2, . . . , gNB beam k) 710 are configured by the gNB for L3 mobility, and correspond to a measurement of an SS (synchronized signal) block (SSB) or a CSI-RS resource detected by the UE in L1.

In FIG. 7, Layer 1 filtering 720 means inner Layer 1 filtering of inputs measured at point A.

In addition, in Beam Consolidation/Selection 730, a beam-specific measurement is consolidated (or integrated) to induce a cell quality.

Layer 3 filtering 740 for a cell quality means filtering performed on measurements provided at point B.

The UE evaluates a reporting criterion whenever a new measurement is reported at least at points C and C1.

D corresponds to measurement report information (message) transmitted on a wireless interface.

In L3 beam filtering 750, filtering is performed on a measurement (a beam-specific measurement) provided at point A1.

In beam selection 760 for beam reporting, X number of measurements provided at point E is selected.

F indicates beam measurement information included in a measurement report (transmitted) on a wireless interface.

In addition, the BM procedures may be classified into (1) a DL BM procedure using a synchronization signal (SS)/physical broadcast channel (PBCH) Block or a CSI-RS, and (2) a UL BM procedure using an SRS.

In addition, each BM procedure may include Tx beam weeping for determining a Tx beam, and Rx beam sweeping for determining an Rx beam.

DL BM Procedure

First, the DL BM procedure will be described.

The DL BM procedure may include (1) transmitting a beamformed DL RS (reference signals) (e.g., a CSI RS or a SS Block (SSB)) of a base station, and (2) beam reporting by a UE.

Herein, the beam reporting may include a preferred DL RS ID(identifier)(s) and L1-RSRP corresponding thereto.

The DL RS ID may be a SSB Resource Indicator (SSBRI) or a CSI-RS Resource Indicator (CRI).

FIG. 8 is a diagram illustrating a Tx beam regarding the DL BM procedure.

As illustrated I FIG. 8, an SSB beam and a CSI-RS beam may be used for beam measurement.

Herein, a measurement metric is L1-RSRP for each resource/block.

An SSB may be used for coarse beam measurement, and a CSI-RS may be used for fine beam measurement.

In addition, the SSB may be used for both Tx beam sweeping and Rx beam sweeping.

The Rx beam sweeping using the SSB may be performed in a manner in which a UE changes an Rx beam for the same SSBRI across a plurality of SSB burst.

Herein, a single SS burst includes one or more SSBs, and a single SS burst set includes one or more SSB bursts.

DL BM Procedure Using SSB

FIG. 9 is a flowchart illustrating an example of the DL BM procedure using SSB.

Configuration of a beam report using an SSB is performed upon CSI/beam configuration in an RRC connected state (or RRC connected mode).

Like CSI-ResourceConfig IE in Table 7, BM configuration using an SSB is not defined additionally, and the SSB is set as a CSI-RS resource.

Table. 7 shows an example of CSI-ResourceConfig IE.

TABLE 7

```
-- ASN1START
-- TAG-CSI-RESOURCECONFIG-START
CSI-ResourceConfig ::=                    SEQUENCE {
    csi-ResourceConfigId                     CSI-ResourceConfigId,
    csi-RS-ResourceSetList                   CHOICE {
        nzp-CSI-RS-SSB                          SEQUENCE {
            nzp-CSI-RS-ResourceSetList              SEQUENCE (SIZE (1..maxNrofNZP-CSI-RS-
ResourceSetsPerConfig)) OF NZP-CSI-RS-ResourceSetId OPTIONAL,
            csi-SSB-ResourceSetList                 SEQUENCE (SIZE (1..maxNrofCSI-SSB-
ResourceSetsPerConfig)) OF CSI-SSB-ResourceSetId  OPTIONAL
        },
        csi-IM-ResourceSetList                  SEQUENCE (SIZE (1..maxNrofCSI-IM-
ResourceSetsPerConfig)) OF CSI-IM-ResourceSetId
    },
    bwp-Id                                   BWP-Id,
    resourceType                             ENUMERATED { aperiodic, semiPersistent, periodic },
    ...
}
-- TAG-CSI-RESOURCECONFIGTOADDMOD-STOP
-- ASN1STOP
```

In Table 7, the parameter csi-SSB-ResourceSetList indicates a list of SSB resources used for beam management and reports in a single resource set.

The UE receives, from the base station, CSI-ResourceConfig IE including CSI-SSB-ResourceSetList which includes SSB resources used for BM (S910).

Herein, the SSB resource set may be configured as {SSBx1, SSBx2, SSBx3, SSBx4, . . . }.

An SSB index may be defined from 0 to 63.

The UE receives the SSB resources from the base station based on the CSI-SSB-ResourceSetList (S920).

In addition, when CSI-RS reportConfig for SSBRI and L1-RSRP reporting is configured, the UE (beam) reports the best SSBRI and L1-RSRP corresponding thereto to the base station (S930).

That is, when reportQuantity in the CSI-RS reportConfig IE is configured as ssb-Index-RSRP, the UE reports the best SSBRI and L1-RSRP corresponding thereto to the base station.

In addition, when a CSI-RS resource is configured in an OFDM symbol(s) identical to an SSB (SS/PBCH Block) and QCL-TypeD is applicable, the UE may assume that the CSI-RS and the SSB are quasi co-located with each other in terms of "QCL-TypeD".

Herein, the QCL Type D may mean that antenna ports are QCL with each other in terms of the spatial Rx parameter. When the UE receives a plurality of DL antenna ports which are in a QCL Type D relationship with each other, it is possible to apply the same Rx beam.

In addition, the UE does not expect that a CSI-RS is configured in an RE overlapping with a RE of the SSB.

DL BM Procedure Using CSI-RS

When a UE receives configuration of NZP-CSI-RS-ResourceSet in which (higher layer parameter) repetition is set to "ON", the UE may assume that at least one CSI-RS resource in NZP-CSI-RS-ResourceSet is transmitted to the same downlink spatial domain transmission filter.

That is, at least one CSI-RS resource in the NZP-CSI-RS-ResourceSet is transmitted via the same Tx beam.

Herein, at least one CSI-RS resource in the NZP-CSI-RS-ResourceSet may be transmitted via a different OFDM symbol or may be transmitted in a different frequency domain (that is, via FDM).

The case where the at least one CSI-RS resource is subject to FDM is when the UE is a multi-panel UE.

In addition, the case where repetition is set to "ON" relates to an Rx beam sweeping procedure of the UE.

The UE does not expect to receive different periodicities at periodicityAndOffset from all CSI-RS resources in the NZP-CSI-RS-Resourceset.

In addition, when the repetition is set to "OFF", the UE does not assume that at least one CSI-RS resource in the NZP-CSI-RS-Resourceset is transmitted to the same downlink spatial domain transmission filter.

That is, at least one CSI-RS resource in the NZP-CSI-RS-Resourceset is transmitted via a different TX bam.

The case where the repetition is set to "OFF" relates to a Tx beam sweeping procedure of a base station.

In addition, the parameter repetition may be set only for CSI-RS resource sets that are associated with CSI-ReportConfig having a report of L1 RSRP or "No Report or None".

If the UE receives CSI-ReportConfig in which reportQuantity is set to "cri-RSRP" or "none" and, CSI-ResourceConfig for channel measurement (higher layer parameter "resourcesForChannelMeasurement") does not include higher layer parameter "trs-Info' but includes NZP-CSI-RS-ResourceSet" which is set to higher layer parameter "repetition" (repetition=ON), the UE may be composed of a port of the same number (1-port or 2-port), which includes higher layer parameter "nrofPorts" for all CSI-RS resources in the NZP-CSI-RS-ResourceSet.

More specifically, regarding the purpose of a CSI-RS, if the parameter repetition is set in a specific CSI-RS resource set and TRS_info is not set, the CSI-RS is used for beam management.

In addition, if the parameter repetition is not set and TRS info is set, the CSI-RS is used for a tracking reference signal (TRS).

In addition, if neither the parameter repetition nor TRS_info is configured, the CSI-RS is used for CSI acquisition.

FIG. 10 is a diagram illustrating an example of a DL BM procedure using a CSI-RS.

FIG. 10a shows an Rx beam determination (or refinement) procedure of a UE, and FIG. 10b shows a Tx beam determination procedure of a base station.

In addition, FIG. 10a shows the case where the parameter repetition is set to "ON", and FIG. 10b shows the case where the parameter "repetition" is set as "OFF".

With reference to FIGS. 10A and 11, the Rx beam determination procedure of the UE will be described.

FIG. 11 is a flowchart illustrating an example of the Rx beam determination procedure of the UE.

The UE receives, from the base station, NZP CSI-RS resource set IE including higher layer parameter repetition through RRC signaling (S1110).

The parameter repetition is set to "ON".

The UE repeatedly receives a resource(s) in a CSI-RS resource set, in which repetition is set to "ON", from a different OFDM symbol through the same Tx beam (or a DL spatial domain transmission filter) (S1120).

In doing so, the UE determines its own Rx beam (S1130).

The UE may omit a CSI report or may transmit a CSI report including CRI/L1-RSRP to the base station (S1140).

In this case, reportQuantity of CSI report Config may be configured as "No report (or None)" or "CRI and L1-RSRP".

That is, when the repetition is set to "ON", the UE may omit a CSI report or may report ID information (CRI) of a beam pair-related preferred beam and a quality value thereof (L1-RSRP).

With reference to FIGS. 10b and 12, the Tx beam determination procedure of the base station will be described.

FIG. 12 is a flowchart illustrating an example of the Tx beam determination procedure of the base station.

A UE receives, from the base station, NZP CSI-RS resource set IE including higher layer parameter repetition through RRC signaling (S1210).

The parameter repetition is set to "OFF" and relates to a Tx beam sweeping procedure of the base station.

In addition, the UE receives resources in a CSI-RS resource set, in which repetition is set to "OFF", via a different Tx beam (a DL spatial domain transmission filter) (S1220).

In addition, the UE selects (or determines) the best beam (S1230), and reports ID and quality information (e.g., L1-RSRP) of the selected beam to the base station (S1240).

In this case, reportQuantity of CSI report Config may be configured as "CRI+L1-RSRP".

That is, when the CSI-RS is transmitted for BM, the UE reports CSI and L1-RSRP corresponding thereto to the base station.

FIG. 13 is a diagram illustrating an example of resource allocation in time and frequency domains, which is related to operation of FIG. 10.

That is, when repetition is set to "ON" for a CSI-RS resource set, a plurality of CSI-RS resources is repeatedly used via the same Tx beam, and, when repetition is set to "OFF" for the CSI-RS resource set, different CSI-RS resources are transmitted via different Tx beams.

DL BM-Related Beam Indication

A UE may receive RRC configuration of a list of a maximum M number of candidate Transmission Configuration Indication (TCI) states at least for the purpose of Quasi Co-location (CQL) indication. Herein, M may be 64.

Each TCI state may be configured as one RS set.

ID of each DL RS for a spatial QCL at least in an RS set (QCL Type D) may refer to at least one of DL RS types such as an SSB, a P-CSI RS, a SP-CSI RS, or a A-CSI RS.

Initialization/update of ID of DL RS(s) in an RS set used at least for a spatial QCL purpose may be performed at least via explicit signaling.

Table 8 shows an example of TCI-State IE.

The TCI-State IE is associated with a quasi co-location (QCL) type corresponding to one or two DL reference signals (RSs).

TABLE 8

```
-- ASN1START
-- TAG-TCI-STATE-START
TCI-State ::=                    SEQUENCE {
    tci-StateId                      TCI-StateId,
    qcl-Type1                        QCL-Info,
    qcl-Type2                        QCL-
Info                                           OPTIONAL,  -- Need R
    ...
}
QCL-Info ::=                     SEQUENCE {
    cell                             ServCellIndex
                OPTIONAL,  -- Need R
    bwp-Id                           BWP-
Id                                             OPTIONAL, -- Cond CSI-RS-
Indicated
    referenceSignal                  CHOICE {
        csi-rs                           NZP-CSI-RS-ResourceId,
        ssb                              SSB-Index
    },
    qcl-Type                         ENUMERATED {typeA, typeB, typeC, typeD},
    ...
}
-- TAG-TCI-STATE-STOP
-- ASN1STOP
```

In Table 8, the parameter "bwp-id" indicates a BL BWP where a RS is located, and the parameter "cell" indicates a carrier where an RS is located, and the parameter "referencesignal" indicates a reference antenna port(s) which is a quasi colocation source for a corresponding target antenna port(s). The target antenna port(s) may be an example of a CSI-RS, a PDCCH DMRS, or a PDSCH DMRS. For example, in order to indicate QCL reference information for a NZP CSI-RS, TCI state ID may be indicated in each CORESET configuration. In another example, in order to indicate QCL reference information for a PDSCH DMRS antenna port(s), DCI state ID may be indicated via DCI.

QCL(Quasi-Co Location)

An antenna port is defined such that a channel over which a symbol on one antenna port is carried can be inferred from another channel over which a symbol on another antenna port is carried. When properties of the channel over which a symbol on one antenna port is carried can be inferred from a channel over which a symbol on another antenna port is carried, the two antenna ports may be in a quasi co-located or quasi co-location (QC/QCL) relationship.

Herein, the channel properties may include at least one of delay spread, Doppler spread, Doppler shift, average gain, and average delay. Herein, the spatial Rx parameter indicates a spatial (reception) channel property parameter such as an angle of arrival.

In order to decode a PDSCH according to a PDCCH which is detected and has DCI intended for a corresponding UE and a given serving cell, a list of M number of TCI-state configurations in higher layer parameter PDSCH-Config may be set. The number M depends on UE capability.

Each TCI-State includes a parameter for setting a quasi co-location relationship between one or two DL reference signals and a DMRS port of the PDSCH.

The quasi co-location relationship may be configured as higher layer parameter qcl-Type 1 for the first DL RS and qcl-Type 2 (when set) for the second DL RS.

If there are the two DL RSs, a QCL type is not the same, regardless of whether the two DL RSs have the same reference or different references.

A quasi co-location type corresponding to each DL RS is given by higher layer parameter "qcl-Type" in QCL-Info, and may take one of the following forms.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, in the case where a target antenna port is a specific NZP CSI-RS, corresponding NZP CSI-RS antenna ports may be indicated/configured to be QCL with a specific TRS in terms of QCL-Type A or with a specific SSB in terms of QCL-Type D. The UE indicated/configured as above may receive a corresponding NZP CSI-RS using a measured Doppler and a delay value, and may apply a Rx beam, which is used in receiving the QCL-TypeD SSB, to receive the corresponding NZP CSI-RS.

The UE receives an activation command used to map eight TCI states to codepoints of a DCI field "Transmission Configuration Indication".

UL BM Procedure

In UL BM, beam reciprocity (or beam correspondence) between a Tx beam and an Rx beam may or may not be achieved depending on how a UE is implemented.

If reciprocity between Tx beam and Rx beam is established both in a base station and in a UE, it is possible to discover a UL beam pair using a DL beam pair.

However, if the reciprocity between Tx beam and Rx beam is not established in any one of the base station or the UE, a UL beam pair determination procedure is required separately from a DL beam pair determination procedure.

In addition, even in the case where both the base station and the UE maintains beam correspondence, the base station is able to use the UL BM procedure to determine a DL Tx beam even without the UE's request for a report of a preferred beam.

UL BM may be performed by transmitting a beamformed UL SRS, and "SRS-SetUse" is configured as "BeamManagement".

Similarly, the UL BM procedure may be classified into Tx beam sweeping by the UE and Rx beam sweeping by the base station.

The UE may receive (through higher layer signaling, RRC signaling, etc.) configuration of one or more SRS resource sets which are configured by (higher layer parameter) "SRS-ResourceSet".

Regarding each SRS resource set, the UE may receive configuration of K≥1 SRS resources (higher later parameter SRS-resource).

Herein, K is a natural number, and the maximum value of K is indicated by SRS_capability.

Whether to apply UL BM of the SRS resource set is configured by (higher layer parameter) SRS-SetUse.

If the parameter SRS-SetUse is configured as 'BeamManagement(BM)', only one SRS resource may be transmitted to each of multiple SRS resource sets at a given time instant.

FIG. 14 is a diagram illustrating an example of the UL BM procedure using an SRS.

Specifically, FIG. 14a shows an RX beam determination procedure by a base station, and FIG. 14b shows a Tx beam determination procedure by a UE.

FIG. 15 is a flowchart illustrating a UL BM procedure using an SRS.

First, a UE receives, from a base station, an RRC signaling (e.g., SRS-Config IE) including (higher layer parameter) usage parameter which is configured as "beam management" (S1510).

Table 9 shows an example of SRS-Config information element (IE), and the SRS-Config IE is used for SRS transmission configuration.

The SRS-Config IE includes a SRS-Resource list and a SRS-ResourceSet list.

Each SRS resource set indicates a set of SRS-resources.

A network triggers transmission of the SRS resource set using aperiodicSRS-ResourceTrigger (L1 DCI) which has been configured.

TABLE 9

```
-- ASN1START
-- TAG-MAC-CELL-GROUP-CONFIG-START
SRS-Config ::=                              SEQUENCE {
    srs-ResourceSetToReleaseList                SEQUENCE (SIZE(1..maxNrofSRS-ResourceSets)) OF
SRS-ResourceSetId           OPTIONAL,           -- Need N
    srs-ResourceSetToAddModList                 SEQUENCE (SIZE(1..maxNrofSRS-ResourceSets)) OF SRS-
ResourceSet                 OPTIONAL,   -- Need N
    srs-ResourceToReleaseList                   SEQUENCE (SIZE(1..maxNrofSRS-Resources)) OF SRS-
ResourceId                  OPTIONAL,           -- Need N
    srs-ResourceToAddModList                    SEQUENCE (SIZE(1..maxNrofSRS-Resources)) OF SRS-
Resource                    OPTIONAL,           -- Need N
    tpc-Accumulation                            ENUMERATED
{disabled}                                                          OPTIONAL,   -- Need S
    ...
}
SRS-ResourceSet ::=                SEQUENCE {
    srs-ResourceSetId                           SRS-ResourceSetId,
    srs-ResourceIdList                          SEQUENCE (SIZE(1..maxNrofSRS-ResourcesPerSet)) OF
SRS-ResourceId     OPTIONAL, -- Cond Setup
    resourceType                                CHOICE {
        aperiodic                                   SEQUENCE {
            aperiodicSRS-ResourceTrigger                INTEGER (1..maxNrofSRS-TriggerStates-1),
            csi-RS                                      NZP-CSI-RS-
ResourceId                                              OPTIONAL, -- Cond NonCodebook
            slotoffset                                  INTEGER
(1..32)                                                     OPTIONAL,   -- Need S
            ...
        },
        semi-persistent                             SEQUENCE {
            associatedCSI-RS                            NZP-CSI-RS-
ResourceId                                              OPTIONAL, -- Cond NonCodebook
            ...
        },
        periodic                                    SEQUENCE {
            associatedCSI-RS                            NZP-CSI-RS-
ResourceId                                              OPTIONAL, -- Cond NonCodebook
            ...
        }
    },
    usage                                       ENUMERATED {beamManagement, codebook, nonCodebook,
antennaSwitching},
    alpha                                       Alpha
                       OPTIONAL, -- Need S
    p0                                          INTEGER (-
202..24)                                                    OPTIONAL, -- Cond Setup
    pathlossReferenceRS                         CHOICE {
        ssb-Index                                   SSB-Index,
        csi-RS-Index                                NZP-CSI-RS-ResourceId
SRS-SpatialRelationInfo ::=    SEQUENCE {
    servingCellId                               ServCellIndex
        OPTIONAL,       -- Need S
    referenceSignal                             CHOICE {
        ssb-Index                                   SSB-Index,
        csi-RS-Index                                NZP-CSI-RS-ResourceId,
        srs                                         SEQUENCE {
            resourceId                                  SRS-ResourceId,
            uplinkBWP                                   BWP-Id
        }
    }
}
SRS-ResourceId ::=                          INTEGER (0..maxNrofSRS-Resources-1)
```

In Table 9, usage indicates a higher layer parameter indicative of whether the SRS resource set is used for beam management or for codebook-based or non-codebook-based transmission.

The usage parameter corresponds to L1 parameter "SRS-SetUse".

"spatialRelationInfo" is a parameter indicative of configuration of a relation between a reference RS and a target SRS.

Herein, the reference RS may be an SSB, a CSI-RS, or an SRS corresponding to L1 parameter "SRS-SpatialRelation-Info".

The usage is configured for each SRS resource set.

In addition, the UE determines a Tx beam for an SRS resource to be transmitted, based on SRS-SpatialRelation Info included in the SRS-Config IE (S1520).

Herein, SRS-SpatialRelation Info is configured for each SRS resource and indicates whether to apply the same beam as a beam used in an SBS, a CSI-RS, or an SRS for each SRS resource.

In addition, SRS-SpatialRelationInfo may or may not be configured for each SRS resource.

If SRS-SpatialRelationInfo is configured for an SRS resource, the SRS-SpatialRelationInfo is transmitted via the same beam as a beam used in an SSB, a CSI-RS, or an SRS.

However, if SRS-SpatialRelationInfo is not configured in an SRS resource, the UE may determine an arbitrary Tx beam and transmit an SRS via the determined Tx beam (S1530).

More specifically, a P-SRS of which 'SRS-ResourceConfigType' is configured as 'periodic' will be described.
  (1) When SRS-SpatialRelationInfo is configured as 'SSB/PBCH', the UE transmits a corresponding SRS resource by applying a spatial domain transmission filter identical to (or generated by) a spatial domain Rx filter used to receive an SSB.PBCH, or
  (2) When SRS-SpatialRelationInfo us configured as"CSI-RS", the UE transmits a corresponding SRS resource having the same spatial domain transmission filter used to receive a periodic CSI-RS or an SP CSI-RS, or
  (3) When SRS-SpatialRelationInfo is configured as "SRS", the UE transmits a corresponding SRS resource by applying the same spatial domain transmission filter used to transmit a periodic SRS.

Even when 'SRS-ResourceConfigType' is configured as "SP-SRS" or "AP-SRS", the above may be applied in the same manner.

Additionally, the UE may or may not receive a feedback on an SRS from the base station in the following three cases (S1540).

First, when Spatial_Relation_Info is configured for all SRS resources in an SRS resource set, the UE transmits an SRS via a beam indicated by the base station.

For example, Spatial_Relation_Info indicates the same SSB, CRI or SRI, the UE repeatedly transmits an SRS via the same beam.

This case corresponds to FIG. 14a which is about a purpose of selecting an Rx beam by the base station.

Second, Spatial_Relation_Info may not be configured for all SRS resources in an SRS resource set.

In this case, the UE may perform transmission by freely changing an SRS beam.

That is, this case corresponds to FIG. 14b which is about a purpose of selecting a Tx beam by the UE.

Lastly, Spatial_Relation_Info may be configured only for some SRS resources in an SRS resource set.

In this case, the UE may transmit an SRS via an indicated beam to the SRS resources for which Spatial_Relation_Info is configured, and the UE may transmit an SRS to other SRS resources, in which Spatial_Relation_Info is not configured, via an arbitrary Tx beam.

CSI Measurement and Reporting Procedure

The NR system supports more flexible and dynamic CSI measurement and reporting.

The CSI measurement may include receiving a CSI-RS, and acquiring CSI by computing the received CSI-RS.

As time domain behaviors of CSI measurement and reporting, aperiodic/semi-persistent/periodic channel measurement (CM) and interference measurement (IM) are supported.

To configure CSI-IM, four port NZP CSI-RS RE patterns are used.

CSI-IM-based IMR of NR has a design similar to CSI-IM of LTE and is configured independent of ZP CSI-RS resources for PDSCH rate matching.

In addition, each port in the NZP CSI-RS-based IMR emulates an interference layer having (a desirable channel and) a pre-coded NZP CSI-RS.

This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≥1 CSI resource set (which is given by higher layer parameter "csi-RS-ResourceSetList").

Herein, a CSI resource setting corresponds to CSI-RS-resourcesetlist.

Herein, S represents the number of configured CSI-RS resource sets.

Herein, configuration of S CSI resource set includes each CSI resource set including CSI-RS resources (composed of NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id.

In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent.

The number S of CSI-RS resource sets configured for periodic and semi-persistent CSI resource settings is restricted to "1".

A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConfig.

When the UE is configured with a plurality of CSI-ResourceConfig having the same CSI-IM resource ID, the same time domain behavior is configured for the CSI-ResourceConfig.

Then, one or more CSI resource settings for channel measurement (CM) and interference measurement (IM) are configured through higher layer signaling.

A CSI-IM resource for interference measurement.

An NZP CSI-RS resource for interference measurement.

An NZP CSI-RS resource for channel measurement.

That is, a channel measurement resource (CMR) may be an NZP CSI-RS for CSI acquisition, and an interference measurement resource (IMR) may be an NZP CSI-RS for CSI-IM and for IM.

Herein, CSI-IM (or a ZP CSI-RS for IM) is primarily used for inter-cell interference measurement.

In addition, an NZP CSI-RS for IM is primarily used for intra-cell interference measurement from multi-user.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resourcesForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForInterference") is used for interference measurement performed on CSI-IM.

CSI computation regarding CSI measurement will be described in more detail.

If interference measurement is performed on CSI-IM, each CSI-RS resource for channel measurement is associated with a CSI-RS resource in a corresponding resource set by an order of CSI-RS resources and CSI-IM resources.

The number of CSI-RS resources for channel measurement is the same as the number of CSI-IM resources.

In addition, when interference measurement is performed on an NZP CSI-RS, the UE is not expected to be configured with one or more NZP CSI-RS resources in an associated resource set within a resource setting for channel measurement.

A UE configured with higher layer parameter nzp-CSI-RS-ResourcesForInterference is not expected to be configured with 18 or more NZP CSI-RS ports in a NZP CSI-RS resource set.

For CSI measurement, the UE assumes the following.

Each NZP CSI-RS port configured for interference measurement corresponds to an interference transmission layer.

Every interference transmission layer of NZP CSI-RS ports for interference measurement considers an energy per resource element (EPRE) ratio.

a different interference signal on a RE(s) of an NZP CSI-RS resource for channel measurement, an NZP CSI-RS resource for interference measurement, or a CSI-IM resource for interference measurement.

A CSI reporting procedure will be described in more detail.

For CSI reporting, time and frequency resources available for an UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with N CSI-ReportConfig reporting setting, M CSI-ResourceConfig resource setting, and a list of one or two trigger states (provided by aperiodicTriggerStateList and semiPersistentOnPUSCH-TriggerStateList) by a higher layer.

In the aperiodicTriggerStateList, each trigger state includes a channel and a list of associated CSI-ReportConfigs selectively indicative of Resource set IDs for interference.

In the semiPersistentOnPUSCH-TriggerStateList, each trigger state includes one associated CSI-ReportConfig.

In addition, a time domain behavior of CSI reporting supports periodic, semi-persistent, and aperiodic CSI reporting.

Hereinafter, periodic, semi-persistent, and aperiodic CSI reporting will be described.

The periodic CSI presorting is performed on a short PUCCH and a long PUCCH.

A periodicity and a slot offset of the periodic CSI reporting may be configured by RRC and refer to CSI-ReportConfig IE.

Then, SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated In the case of SP CSI on a PUSCH, a periodicity of SP CSI reporting is configured by RRC, but a slot offset thereof is not configured by RRC and SP CSI reporting is activated/deactivated by DCI (format 0_1).

The first CSI reporting timing follows a PUSCH time domain allocation value indicated by DCI, and subsequent CSI reporting timing follows a periodicity which is configured by RRC.

For SP CSI reporting on a PUSCH, a separated RNTI (SP-CSI C-RNTI) is used.

DCI format 0_1 may include a CSI request field and activate/deactivate a specific configured SP-CSI trigger state.

In addition, SP CSI reporting is activated/deactivated identically or similarly to a mechanism having data transmission on a SPS PUSCH.

Next, aperiodic CSI reporting is performed on a PUSCH and triggered by DCI.

In the case of AP CSI having an AP CSI-RS, an AP CSI-RS timing is configured by RRC.

Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR.

Instead, NR restricts configuring specific CSI reporting on a short/long PUCCH, and a CSI omission rule is defined.

Regarding an AP CSI reporting timing, PUSCH symbol/slot location is dynamically indicated by DCI. In addition, candidate slot offsets are configured by RRC.

Regarding CSI reporting, a slot offset(Y) is configured for each reporting setting.

Regarding UL-SCH, a slot offset K2 is configured separately.

Two CSI latency classes (low latency class and high latency class) are defined in terms of CSI computation complexity.

The low latency CSI is WB CSI that includes up to 4-ports Type-I codebook or up to 4-ports non-PMI feedback CSI.

The high latency CSI is a CSI other than the low latency CSI.

Regarding a normal UE, (Z, Z') is defined in a unit of OFDM symbols.

Z represents the minimum CSI processing time after receiving CSI triggering DCI and before performing CSI reporting.

Z' represents the minimum CSI processing time after receiving CSI-RS about a channel/interference and before performing CSI reporting Additionally, the UE reports the number of CSI which can be calculated at the same time.

CSI Reporting Using PUSCH

FIG. 16 shows an example of information payload of PUSCH-based CSI reporting.

NZBI is a parameter representing an indication of the number of non-zero wideband amplitude coefficients for each layer in Type II PMI code book.

When DCI is decoded, a UE performs aperiodic CSI reporting using a PUSCH of a serving cell c.

The aperiodic CSI reporting performed on the PUSCH supports wideband and sub-band frequency granularity.

The aperiodic CSI reporting performed on the PUSCH supports Type I and Type II CSI.

If DCI format 0_1, which activates a semi-persistent (SP) CSI trigger state, is decoded, a UE performs SP CSI reporting on the PUSCH.

DCI format 0_1 includes a CSI request field indicative of an SP CSI trigger state to be activated or deactivated.

SP CSI reporting on the PUSCH supports Type I and Type II CSI having wideband and sub-band frequency granularity.

A PUSCH resource and a Modulation and Coding Scheme (MCS) for SP CSI reporting are semi-persistently allocated by UL DCI.

CSI reporting for the PUSCH may be multiplexed with UL data on the PUSCH.

In addition, CSI reporting for the PUSCH may be performed without being multiplexed with UL data.

As illustrated in FIG. 16, regarding Type I and Type II CSI, CSI reporting on the PUSCH may include two parts (Part 1 and Part 2) illustrated in FIG. 16.

Part 1 (1610) is used to identify the number of information bits of Part 2 (1620). Part 1 is entirely transmitted before Part 2.

Regarding Type I CSI feedback, Part 1 includes (when reported) RI, (when reported) CRI, and CQI of the first codeword.

Part 2 includes a PMI, and, when RI>4, parts 2 includes a CQI.

Regarding Type II CSI feedback, Part 1 has a fixed payload size and includes an RI, a CQI, and an indication (NZBI) indicative of the number of non-zero wideband amplitude coefficients for each layer of Type II CSI.

In Part 1, the RI, the CQI, and the NZBI are encoded additionally.

Part 2 includes a PMI of Type II CSI.

Part 1 and Part 2 are additionally encoded.

A Type II CSI report transmitted on the PUSCH is calculated independent of every Type II CSI reporting transmitted on PUCCH format 1, 3, or 4.

If higher layer parameter reportQuantity is set to one of "cri-RSRP" or "ssb-Index-RSRP", a CSI feedback is composed of a single Part.

Regarding Type I and Type II CSI reporting which are configured for a PUCCH but transmitted on a PUSCH, an encoding scheme follows an encoding scheme of the PUCCH.

If CSI reporting includes two parts in the PUSCH and a CSI payload is smaller than a payload size provided by a PUSCH resource allocated for CSI reporting, the UE may omit some of Part 2 CSI.

Omission of Part 2 CSI is determined by a priority order, and Priority 0 is the highest priority and $2N_{Rep}$ is the lowest priority.

CSI Reporting Using PUCCH

A UE is configured semi-statically by a higher layer in order to perform periodic CSI reporting on a PUCCH.

The UE may be configured by higher layers for multiple periodic CSI reports corresponding to one or more higher layer configured CSI reporting setting Indications, where the associated CSI Measurement Links and CSI Resource Settings are higher layer configured.

In PUCCH format 2, 3, or 4, periodic CSI reporting supports Type I CSI based on a wide bandwidth.

Regarding SP CSI on a PUSCH, the UE performs SP CSI report on a PUCCH which has applied from a slot n+$3N_{slot}^{subframe,\mu}+1$ after HARQ-ACK corresponding to a PDSCH carrying a selection command was transmitted from a slot n.

The selection command includes one or more report setting indications where associated CSI resource settings are configured.

The SP CSI report supports Type I CSI on the PUCCH.

SP CSI report in PUCCH format 2 supports Type I CSI having a wide bandwidth frequency granularity. SP CSI report in PUCCH format 3 or 4 supports Type I sub-band CSI and Type II CSI having a wide bandwidth granularity.

When the PUCCH carries Type I CSI having a wide bandwidth frequency granularity, CSI payloads carried by PUCCH format 2 and PUCCH format 3 or 4 are the same, irrespective of (when reported) RI, (when reported) CRI.

In PUCCH format 3 or 4, Type I CSI sub-band payload is divided into two parts.

The first part (Part 1) includes (when reported) RI, (when reported) CRI, and CQI of the first codeword.

The second part (Part 2) includes PMI, and, when RI>4, the second part (Part 2) includes CQI of the second codeword.

SP CSI reporting carried in PUCCH format 3 or 4 supports Type II CSI feedback, but only Part 1 of Type II CSI feedback.

In PUCCH format 3 or 4 supporting Type II CSI feedback, CSI report may depend on a UE capability.

Type II CSI report (only Part 1 thereof) carried in PUCCH format 3 or 4 is computed independently of Type II CSI report carried in the PUSCH.

When the UE is configured with CSI reporting in PUCCH format 2, 3, or 4, each PUCCH resource is configured for each candidate UL BWP.

In the case where the UE receives active SP CSI report configuration in the PUCCH and does not receive a deactivation command, CSI reporting is performed when a BWP which is CSI-reported is an active BWP and, otherwise, CSI reporting is temporarily stopped. This operation applies even in the case of SP CSI on PUCCH. Regarding PUSCH-based SP CSI report, it is understood that corresponding CSI report is automatically deactivated when BWP switching occurs.

Table 10 shows an example of a PUCCH format

TABLE 10

| PUCCH format | Length in OFDM symbols $N_{symb}^{PUCCH}$ | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

In Table 10, $N_{symb}^{PUCCH}$ indicates a length of PUCCH transmission in an OFDM symbol.

In addition, depending on the length of PUCCH transmission, the PUCCH format may be classified as a short PUCCH or a long PUCCH.

In Table 10, PUCCH format 0 and 2 may be called the short PUCCH, and PUCCH format 1, 3, and 4 may be called the long PUCCH.

Hereinafter, regarding PUCCH-based CSI reporting, short PUCCH-based CSI reporting and long PUCCH-based CSI reporting will be described in more detail.

FIG. 17 shows an example of information payload of short PUCCH-based CSI reporting.

The short PUCCH-based CSI reporting is used only for wideband CSI reporting.

The short PUCCH-based CSI reporting has the same payload regardless of an RI/CRI in a given slot (in order to avoid blind decoding).

A size of the information payload may be different between the maximum CSI-RS ports of a CSI-RS configured in a CSI-RS resource set.

When a payload including a PMI and a CQI are diversified to including an RI/CQI, padding bits are added to the RI/CRI/PMI/CQI before an encoding procedure for equalizing a payload associated with different RI/CRI values.

In addition, the RI/CRI/PMI/CQI may be encoded with the padding bits, when necessary.

Next, long PUCCH-based CSI reporting will be described.

FIG. 18 shows an example of information payload of long PUCCH-based CSI reporting.

For wideband reporting, the long PUCCH-based CSI reporting may use the same solution as that of the short PUCCH-based CSI reporting.

The long PUCCH-based CSI reporting has the same payload regardless of an RI/CRI.

For sub-band reporting, Two-part encoding (For Type I) is applied.

Part 1 (1810) may have a fixed payload according to the number of ports, a CSI type, RI restriction, and the like, and Part 2 (1820) may have a variety of payload sizes according to Part 1.

The CSI/RI may be first encoded to determine a payload of the PMI/CQI.

In addition, CQIi(i=1,2) corresponds to a CQI for the i-th codeword (CW).

Regarding a long PUCCH, Type II CSI reporting may carry only Part 1.

Beam Failure Detection (BFD) and Beam Failure Recover (BFR) Procedures

Next, a BFD procedure and a BFR procedure will be described.

In a Beamformed system, a Radio Link Failure (RLF) may often occur due to a UE's rotation, movement, or beam blockage.

Accordingly, in order to prevent frequent occurrence of the RLF, RFR is supported in NR.

The BFR may be similar to a radio link failure recovery procedure and supported when a UE knows a new candidate beams( ).

For a better understanding, (1) radio link monitoring and (2) link recovery procedures will be described first in brief.

Radio Link Monitoring

A DL radio link quality of a primary cell is monitored by a UE in order to indicate an out-of-sync or in-sync state to higher layers.

The term "cell" used in the present disclosure may be a component carrier, a carrier, a BW, and the like.

A UE does not need to a DL radio link quality in a DL BWP other than an active DL BWP on the primary cell.

The UE may be configured for each DL BWP of SpCell having a set of resource indexes through a set corresponding to higher layer parameter) RadioLinkMonitoringRS for radio link monitoring by higher layer parameter failureDetectionResources.

Higher layer parameter RadioLinkMonitoringRS having a CSI-RS resource configuration index (csi-RS-Index) or an SS/PBCH block index(ssb-Index) is provided to the UE.

In the case where RadioLinkMonitoringRS is not provided to the UE and instead TCI-state for PDCCH including one or more RSs including one or more from a CSI-RS and/or an SS/PBCH block is provided to the UE, when active TCI-state for PDCCH include a single RS, the UE uses the RS, provided for the active TCI-state for PDCCH, for radio link monitoring.

when active TCI-state for PDCCH includes two RSs, the UE is not expected to have one RS has QCL-TypeD and use one RS for radio link monitoring. Herein, the UE does not expect that both the two RSs has QCL-TypeD.

the UE does not use aperiodic RS for radio link monitoring.

The following Table 11 shows an example of RadioLinkMonitoringConfig IE.

The RadioLinkMonitoringConfig IE is used to configure radio link monitoring for detecting a beam failure and/or a cell radio link failure.

TABLE 11

```
-- ASN1START
-- TAG-RADIOLINKMONITORINGCONFIG-START
RadioLinkMonitoringConfig ::=         SEQUENCE {
    failureDetectionResourcesToAddModList      SEQUENCE
(SIZE(1..maxNrofFailureDetectionResources)) OF RadioLinkMonitoringRS        OPTIONAL, -- Need N
    failureDetectionResourcesToReleaseList      SEQUENCE
(SIZE(1..maxNrofFailureDetectionResources)) OF RadioLinkMonitoringRS-Id OPTIONAL,-- Need N
    beamFailureInstanceMaxCount            ENUMERATED {n1, n2, n3, n4, n5, n6, n8,
n10}                          OPTIONAL, -- Need S
    beamFailureDetectionTimer           ENUMERATED {pbfd1, pbfd2, pbfd3, pbfd4, pbfd5,
pbfd6, pbfd8, pbfd10}     OPTIONAL,    -- Need R
    ...
}
RadioLinkMonitoringRS ::=         SEQUENCE {
    radioLinkMonitoringRS-Id            RadioLinkMonitoringRS-Id,
    purpose                     ENUMERATED {beamFailure, rlf, both},
    detectionResource               CHOICE {
        ssb-Index                   SSB-Index,
        csi-RS-Index                NZP-CSI-RS-ResourceId
    },
    ...
}
-- TAG-RADIOLINKMONITORINGCONFIG-STOP
-- ASN1STOP
```

In Table 11, the parameter beamFailureDetectionTimer is a timer for beam failure detection.

The parameter beamFailureDetectionTimer indicates that the UE triggers a beam failure recovery after how many beam failure events.

Value n1 corresponds to 1 beam failure instance, and value n2 corresponds to 2 beam failure instances. If a network reconfigures a corresponding field, the UE resets a counter related to on-goingbeamFailureDetectionTimer and beam Failure InstanceMaxCount.

If there is no corresponding field, the UE does not trigger a beam failure recovery.

Table 12 shows an example of BeamFailureRecoveryConfig IE.

For beam failure detection, the BeamFailureRecoveryConfig IE is used to configure the UE with RACH resources and candidate beams for beam failure recovery.

TABLE 12

```
-- ASN1START
-- TAG-BEAM-FAILURE-RECOVERY-CONFIG-START
BeamFailureRecoveryConfig ::=        SEQUENCE {
    rootSequenceIndex-BFR         INTEGER
(0..137)                                      OPTIONAL, -- Need M
    rach-ConfigBFR           RACH-
ConfigGeneric                                        OPTIONAL, -- Need M
    rsrp-ThresholdSSB         RSRP-
Range                                           OPTIONAL, -- Need M
    candidateBeamRSList          SEQUENCE (SIZE(1..maxNrofCandidateBeams)) OF PRACH-
ResourceDedicatedBFR    OPTIONAL,   -- Need M
    ssb-perRACH-Occasion         ENUMERATED {oneEighth, oneFourth, oneHalf, one, two,
four, eight, sixteen}       OPTIONAL,  -- Need M
    ra-ssb-OccasionMaskIndex         INTEGER
(0..15)                                      OPTIONAL, --- Need M
    recoverySearchSpaceId           SearchSpaceId
                    OPTIONAL, -- Cond CF-BFR
    ra-Prioritization          RA-
Prioritization                                       OPTIONAL, -- Need R
    beamFailureRecoveryTimer         ENUMERATED {ms10, ms20, ms40, ms60, ms80, ms100,
ms150, ms200}       OPTIONAL, -- Need M
    ...
}
PRACH-ResourceDedicatedBFR ::=       CHOICE {
    ssb                     BFR-SSB-Resource,
    csi-RS                  BFR-CSIRS-Resource
}
BFR-SSB-Resource ::=          SEQUENCE {
    ssb                     SSB-Index,
    ra-PreambleIndex              INTEGER (0..63),
    ...
}
```

TABLE 12-continued

```
BFR-CSIRS-Resource ::=        SEQUENCE {
    csi-RS,                      NZP-CSI-RS-ResourceId
    ra-OccasionList              SEQUENCE (SIZE(1..maxRA-OccasionsPerCSIRS)) OF INTEGER
    (0..maxRA-Occasions-1)   OPTIONAL,  -- Need R
    ra-PreambleIndex             INTEGER
    (0..63)                                                    OPTIONAL,  -- Need R
    ...
}
-- TAG-BEAM-FAILURE-RECOVERY-CONFIG-STOP
-- ASN1STOP
```

In Table 12, the parameter beamFailureRecoveryTimer is a parameter indicative of a timer for beam failure recovery, and a value of the parameter is set to ms.

The parameter candidateBeamRSList is a parameter indicative of a list of reference signals (CSI-RS and/or SSB) to identify random access (RA) parameters associated with candidate beams for recovery.

The parameter RecoverySearchSpaceId represents a search space used for BFR random access response (RAR).

If radio link quality is poorer than the threshold Qout, the physical layer of a UE indicates the out-of-sync status for a higher layer within a radio frame whose radio link quality was measured.

If the radio link quality is better than the threshold Qin, the physical layer of the UE indicates the in-sync status for a higher layer within a radio frame whose radio link quality was measured.

Link Recovery Procedure

A UE is provided, for a serving cell, with a set q0 of periodic CSI-RS resource configuration indexes by higher layer parameter failureDetectionResources, and a set q1 of periodic CSI-RS resource configuration indexes and/or SS/PBCH block indexes by candidateBeamRSList for measuring a radio link quality on the serving cell.

If the UE is not provided with higher layer parameter failureDetectionResources, the UE determines the set q0 to include SS/PBCH block indexes and periodic CSI-RS resource configuration indexes with same values as the RS indexes in the RS sets indicated by the TCI states for respective control resource sets that the UE uses for monitoring PDCCH.

If a threshold Qout_LR corresponds to the default value of higher layer parameter rim InSyncOutOfSyncThreshold and to the value provided by higher layer parameter rsrp-ThresholdSSB, respectively.

The physical layer of the UE evaluates the radio link quality according to the set q0 of resource configurations against the threshold Qout_LR.

For the set q0, the UE assesses the radio link quality only according to periodic CSI-RS resource configurations or SS/PBCH blocks that are quasi co-located with the DM-RS of PDCCH receptions monitored by the UE.

The UE applies a Qin_LR threshold to a L1-RSRP measurement obtained from the SS/PBCH block.

The UE applies the Qin_LR threshold to the L1-RSRP measurement obtained for a CSI-RS resource after scaling a respective CSI-RS reception power with a value provided by higher layer parameter powerControlOffsetSS.

The physical layer in the UE provides an indication to higher layers when the radio link quality for all corresponding resource configurations in the set that the UE uses to assess the radio link quality is worse than the threshold Qout_LR.

The physical layer informs the higher layers when the radio link quality is worse than the threshold Qout_LR with a periodicity determined by the maximum between the shortest periodicity of periodic CSI-RS configurations or SS/PBCH blocks in the set q0 that the UE uses to assess the radio link quality and 2 msec.

Upon request from higher layers, the UE provides to the higher layers the periodic CSI-RS configuration indexes and/or SS/PBCH block indexes from the set q1 and the corresponding L1-RSRP measurements that are larger than or equal to the corresponding thresholds.

A UE may be provided with a control resource set through a link to a search space set provided by higher layer parameter recoverySearchSpaceId for monitoring PDCCH in the control resource set.

If the UE is provided higher layer parameter recoverySearchSpaceId, the UE does not expect to be provided another search space set for monitoring PDCCH in the control resource set associated with the search space set provided by recoverySearchSpaceId.

The aforementioned BFD and BFR procedure will be described again.

If beam failure is detected on a serving SSB or a CSI-RS(s), a BFR procedure used to indicate a new SSB or CSI-RS to a serving base station may be configured by RRC.

The RRC configures Beam FailureRecoveryConfig for a beam failure detection and recovery procedure.

FIG. 19 is a flowchart illustrating an example of a BFR procedure.

The BFR procedure may include (a) a step of beam failure detection (S1910), (2) a step of new beam indication (s1920), a step of Beam Failure Recovery Request (RFRQ) (S1930), and (4) a step of monitoring a response to the BFRQ from a base station (S1940).

Herein, for the step S1930, that is, for transmission of the BFRQ, a PRACH preamble or a PUCCH may be used.

The step S1910, that is, beam failure detection will be described in more detail.

When block error rates (BLERs) of all serving beams are greater than a threshold, it is called a beam failure instance.

An RS set q0, which a UE will monitor, is explicitly configured by RRC or implicitly determined by a beam RS for a control channel.

An indication of the beam failure instance to higher layer is periodic, and an indication interval is determined by the shortest periodicity of BFD RS set.

If an evaluation is lower than a beam failure instance BLER threshold, there is no indication to higher layer.

When N number of consecutive beam failure instances has occurred, a beam failure is declared.

Herein, N is the parameter NrofBeamFailureInstance which is configured by RRC.

1-port CSI-RS and SSB are supported for a BFD RS set.

Next, the step S1920, that is, new beam indication will be described.

A network NW may transmit configuration of one or multiple PRACH resources/sequences to a UE.

A PRACH sequence is mapped to at least one new candidate beam.

The UE selects a new beam from among candidate beams having L1-RSRP equal to or greater than a threshold configured by RRC, and transmits a PRACH via the selected beam. In this case, which beam the UE selects may be an UE implementation issue.

Next, the steps S1930 and S1940, that is, transmitting a BFRQ and monitoring a response to the BRFQ will be described.

A dedicated CORESET may be configured by RRC to monitor a time duration of a window and the response to the BFRQ from the base station.

The UE starts to monitor after 4 slots of PRACH transmission.

The UE assumes that the dedicated CORESET is spatial QCL with a DL RS of a UE-identified candidate beam in the beam failure recovery request.

If the timer expires or when the number of PRACH transmission reaches the maximum number, the UE stops the BFR procedure.

Herein, the maximum number of PRACH transmission and the timer are configured with RRC.

A NR system defines a method of designing a RS for fine time/frequency tracking, and a method of configuring (indicating) an RS for time/frequency tracking in a UE.

More specifically, before RRC connection (or a RRC_connected state), the UE may perform time and/or frequency tracking with a signal for initial access, such as a physical broadcast channel (PBCH), a demodulation reference signal (DMRS), a primary synchronization signal (PSS), a secondary synchronization signal (SSS).

Herein, the time/frequency tracking may mean a procedure of discovering (or tracking) a time/frequency about signal transmission and reception.

The expression "A and/or B" used throughout the present disclosure may be interpreted as the same as "including at least one of A or B".

In addition, when the RRC connection is established (or in the RRC connected state), an RC for much finer time/frequency tracking may be configured in the UE by the base station.

The RRC connected state may be expressed as an RRC connected mode.

Hereinafter, an RS used for time/frequency tracking will be referred to as a "tracking reference signal (TRS)"

To configure a TRS in the UE, two methods may be considered.

The first method is a method in which an additional RS (which is distinguishable from other RS) called a TRS is defined and then the additional RS is explicitly configured.

The second method is a method in which, when an RS for tracking is configured using (some of) CSI-RS configurations, the UE enhances prediction of time/frequency tracking by itself.

That is, the first method may be a method of explicitly configuring a TRS, and the second method may be a method of implicitly configuring a TRS.

The TRS defined in NR is identical to a cell-specific RS (CRS) defined in LTE since the both are about a time/frequency tracking function, but it is different from the CRS in LTE since the TRS is not cell-specifically transmitted.

Hereinafter, a TRS designing method and a TRS configuring method, proposed by the present disclosure, will be described in detail.

The base station may explicitly or implicitly configure a CSI-RS having the following properties ((1) to (4)) for a time/frequency tracking.

(1) Single or multiple 1-port CSI-RS resources

The 1-port CSI-RS resources may be periodic and QCL with a specific signal.

A CSI-RS resource indicates a transmission (or reception) pattern of a CSI-RS, includes at least one RE(s), and relates to an antenna port, a code division multiplexing (CDM) scheme, and the like.

The multiple 1-port CSI-RS resources have the same periodicity and are transmitted from the same slot or in consecutive slots.

For example, slot offsets between the multiple CSI-RS resources may be set to 0, 1, or 2.

If the slot offsets between the multiple CSI-RS resources are the same, a symbol location of each CSI-RS resource may be different in a slot, and the symbol location may be non-consecutive, that is, symbol locations of different CSI-RS resources may have a symbol interval equal to or greater than a predetermined value.

That is, the UE does not expect that a CSI-RS (resource) exists in consecutive symbols.

Alternatively, if the CSI-RS exists in consecutive symbols, the corresponding CSI-RS may be defined as being used for a purpose (e.g., beam management) other than the TRS purpose.

Additionally, a QCL relationship between the multiple CSI-RS resources may be assumed (or indicated).

(2) A Property of a specific RE pattern(s) may be given.

No code division multiplexing (CDM) may be defined. That is, a TRS or a CSI-RS for TRS may occupy just 1 resource element (RE) on the time and frequency axes.

In addition, a frequency domain density may be equal to or greater than 1 RE/RB/port.

In addition, a time domain density may be equal to or greater than 1 RE/slot/port.

If the time domain density is greater than 1, it may be limited to the case where symbols in which a CSI-RS exists are non-consecutive. That is, a pattern of non-consecutive symbols may be excluded.

(3) TRS configuration may be configured (or applied) only when it is configured as a CSI-RS resource type used for beam management (BM).

That is, even in the case of a 1-port resource, a CSI-RS type for CSI acquisition may be restricted not to be used for a TRS purpose.

(4) A CSI-RS for TRS is periodically or semi-persistently transmitted and has a property that a time domain measurement restriction becomes "OFF".

In a method of configuring a TRS by aggregating multiple 1-port CSI-RS resources among the aforementioned methods, it is assumed (or indicated) that the CSI-RS resources are all QCL.

This means that the CSI-RS resources are QCL even in terms of a spatial Rx parameter since the multiple CSI-RS resources are transmitted via the same beam along with a channel's long term property such as Doppler, Delay, Gain, etc.

In addition, it may be more desirable to guarantee that CSI-RSs which configure a TRS have the same short term channel property (e.g., phase offset, and delay profile).

Alternatively, it may be more desirable to allow corresponding CSI-RS resources or ports to estimate (or infer) each other's channel from a radio channel experienced by other resources (or ports).

For reference, an antenna port is defined such that a channel over which a symbol on one antenna port is transmitted can be inferred from another channel over which a symbol on another antenna port is transmitted.

Accordingly, it may be more desirable that the multiple 1-port CSI-RS resources are assumed (or indicated) to be in a more strong association relationship stronger than QCL.

As an example of the association relationship, the same antenna port may be assumed (or indicted), or a new term indicating that antenna ports/resources have the same short-term channel property or that the antenna ports/resources can be inferred with the same channel may be defined.

In doing so, a method of assuming (or indicating) a corresponding relationship (GCL or IAP) between the CSI-RS resources (or ports) may be defined additionally.

GCL (genuine co-location): a (short and long) property of a channel over which a symbol on one antenna port is transmitted can be inferred from a channel over which a symbol on another antenna port is transmitted, the two antenna ports are defined as being GCL with each other.

IAP (identical antenna port): in the case where a channel over which a symbol on one antenna port is transmitted can be inferred from a channel over which a symbol on another antenna port is transmitted, the two antenna ports are defined as being identical.

Alternatively, in addition to the six parameters (delay spread, Doppler spread, Doppler shift, average gain, average delay, and spatial Rx parameters) in the previously defined relationship QCL, it is possible to add new (short-term) channel parameters (e.g., delay profile, Doppler profile, phase offset, instantaneous gain, etc.) and then assume (or indicate) a QCL relationship (even) with the new channel parameters between the corresponding CSI-RS (or ports).

In another embodiment, the following methods may be additionally defined regarding TRS configuration.

(1) (CSI-RS resources having the above properties (1) to (4) in) some resource settings out of resource settings defined for CSI acquisition and beam management may be configured for TRS.

The resource settings for TRS may be distinguished by the following properties.
- a resource setting without linkage to any reporting settings, or
- a resource setting with linkage to a NULL reporting setting, or
- wherein the null reporting setting may mean a report setting indicating that an UE does not need to report any information to a gNB,
- a resource setting with linkage to a reporting setting for TRS quality feedback (e.g., L1-RSRP).

With the above properties unlike other resource settings, RSs for TRS are used to enhance channel estimation performance of a UE and do not needs to be used for reporting of the UE.

However, exceptionally, RSRP reporting may be configured in a reporting setting to allow a base station to confirm a TRS quality.

Accordingly, when the base station (periodically) transmits a TRS through a resource setting in which a report setting is not configured (and/or resource setting in which TRS quality reporting is configured), the UE may perform time/frequency tracking via a corresponding resource.

The resource setting, in which reporting is excluded (or CSI-RS quality reporting is configured), may be used not just for TRS but also for Rx beam selection/refinement.

That is, when the base station repeatedly transmits a CSI-RS via the same beam (to different symbols), the UE may perform Rx beam selection/refinement (e.g., P-3 purpose) while changing a Rx beam.

In this case, a procedure in which the UE reports beam quality information (L1-RSRP or CQI) of a (refined) Rx beam to the base station may be added.

The P-3 operation and the fine time/frequency tracking operation may be the same as the above description in terms of RS transmission setting of the base station.

However, in the former case, since the UE receives signals while changing an Rx beam, tracking may not be possible but beam selection may be possible.

In addition, in the latter case, the UE may enhance tracking performance while receiving the CSI-RS via the same beam but may not be able to perform beam selection.

To distinguish the above two purposes, the following methods may be defined additionally.
- The base station may add, in a resource setting, an indicator indicative of P-3 purpose or TRS purpose.
- It may be implicitly distinguished such that a CSI-RS is transmitted to consecutive symbols for P-3 purpose, and a CSI-RS resource is transmitted to non-consecutive symbols or at a predetermined symbol interval for TRS purpose.
- Since the UE receives a CSI-RS symbol(s) for P-3 purpose while changing a (Rx) beam, the CSI-RS symbol is not allowed to be frequency domain multiplexing (FDM) with a different signal (or channel, for example, a PDSCH) and received at the same time.

However, for TRS purpose, the UE does not change a (Rx) beam, so the CSI-RS symbol is FDM with a different signal (or channel) and received at the same time, and, this property makes it possible to implicitly distinguish TRS purpose.

If a CSI-RS and a PDSCH are multiplexed, the property may be indicated through whether the corresponding CSI-RS symbols are PDSCH rate matched.

For reference, P-3 purpose may be achieved using a single symbol CSI-RS which is transmitted in a comb X form.

It is because repeated signals in the form of a sub-symbol are generated X number of times in a single symbol section.
- P-3 purpose and TRS purpose may be implicitly distinguished such that a CSI-RS is transmitted aperiodically for P-3 purpose and a CSI-RS is transmitted periodically or semi-persistently for TRS purpose.

In addition, in order to remove ambiguity regarding distinguishing the P-3 purpose and the TRS purpose, CSI-RS resources for TRS may be configured separately from resource settings included in a CSI/beam management framework or TRS may be defined as an RS distinguishable from a CSI-RS (that is, defined with a different antenna port).

Herein, TRS resources (or ports) respectively indicate QCL linkage with resource settings configured in a CSI/beam management framework or with NZP resources on the basis of a resource set unit.

That is, resources for fine time/frequency tracking per CSI-RS beam (group) may be configured through QCL linkage.

The QCL linkage may be a unit of a CSI-RS resource (or port/beam) corresponding to a CSI-RS beam.

In addition, QCL linkage with a TRS may be indicated (or configured) on the basis of a synchronization signal (SS)

block (group), which is a transmission unit of a synchronization signal, through beam forming.

In addition, if multiple TRS resources are configured with RRC for fine time/frequency tracking of each beam and/or transmission reception point (TRP), measurement, reception, activation, monitoring, and rate matching of only a specific TRS resource(s) (corresponding to a serving beam(s)) may be indicated in order to adjust resource overhead.

Such an indication may be enabled implicitly by spatial QCL indication information between a CSI-RS resource (or an SS block) and a PDCCH DMRS for PDCCH reception beam configuration.

That is, when QCL information between a specific CSI-RS resource (or SS block) and a PDCCH DMRS is indicated (by MAC CE) to receive a PDCCH, reception, measurement, activation, and rate-matching may be performed only on a TRS resource which is predetermined to be in QCL linkage to the corresponding CSI-RS resource or (an SS block).

When multiple PDCCH Rx beams are configured, TRS resources connected to all or some (e.g., only primary PDCCH) of corresponding CSI-RS resources (or SS blocks) may be subject to reception, measurement, activation, monitoring, and rate-matching.

Alternatively, a TRS resource(s) may be configured to be subject to reception, measurement, activation, and rate-matching based on a PDSCH beam.

In this case, the PDSCH beam may be dynamically changed by DCI. Accordingly, TRS resources linked to multiple CSI-RS (or SS block) beams/resources possibly to be changed may be (all) activated, monitored, and rate matched.

The candidate CSI-RS (or SS block) beams/resources may be (i) determined by (multiple) preferred beam index(s) (e.g., CRI or CRI+port selection PMI) reported by a UE, or (ii) directly/indirectly indicated by a base station.

In the case of (ii), a TRS resource(s) for receiving, measuring, activating, monitoring, and rate-matching of a TRS may be directly indicated, or a CSI-RS resource(s) or an SS block(s) which is in QCL linkage indirectly to the TRS resource(s) may be indicated.

If the TRS resource(s) is indirectly indicated, the corresponding CSI-RS (or SS block) may be indicated as TRP and/or beam set information that can transmit a PDSCH.

This may match with CSI-RS (or SS block) resource information items which can be indicated with a PDSCH beam.

For example, if ten CSI-RS resources (beams) are configured with RRC, four out of the ten CSI-RS resources may be selected and indicated as MAC CEs (according to beam-related feedback information of the UE), and then one out of the four CSI-RS resources may be dynamically indicated by 2-bit DCI to be (spatial) QCL with a PDSCH DMRS.

In this case, the four CSI-RS resources indicated as MAC CEs are beam candidates capable of transmitting a PDSCH, and therefore, TRS reception/measurement/activation/monitoring/rate matching may be performed on only TRS resources which are QCL with the CSI-RS resources indicated as the MAC CEs, while TRS reception/measurement/activation/monitoring/rate matching may not be performed on TRS resources which are QCL with other six CSI-RS resources (beams).

That is, only a 1-port and high-density CSI-RS, which is QCL with resources indicated by an MAC CE, may be (automatically) activated in order to indicate a spatial QCL between a PDSCH DMRS and the CSI-RS.

In this case, a transmission cycle, a slot offset, and the like of the corresponding TRS (or the 1-port and high-density CSI-RS) may be configured with RRC.

The rate matching is an operation of performing RE mapping on a PDSCH or a PUSCH, which is a data transmission channel, except a corresponding TRS RE(s), so as to control interference from the corresponding TRS on a data channel and interference from the data channel on the corresponding TRS.

In terms of rate matching, it is possible to perform TRS rate matching not just on a PDCCH/PDSCH beam but also on neighboring beams of the corresponding beam in order to control interference.

A beam ID set or a TRS set subject to rate matching according to an indicated (or configured) PDCCH/PDSCH beam ID (e.g., a CSI-RS resource or SS block ID which is in spatial QCL with a PDCCH/PDSCH DMRS) may be configured by a network (with an RRC message) or may be predefined according a certain rule (via table, formula, etc.).

For example, when CRI (or SS block ID)=X, wherein the CRI is indicated (or reported by a UE) as a PDCCH/PDSCH (candidate) beam, CSI-RS resource indexes (or SS block IDs) subject to TRS rate matching may be configured or may be predefined by a rule.

Herein, TRS resources which are QCL with corresponding CSI-RS resources (or SS blocks) may be subject to rate matching.

In another example, a resource(s) subject to rate matching among multiple TRS resources configured by RRC may be dynamically and directly or indirectly indicated by an MAC CE and/or DCI.

A method for indirect indication may be, when PDSCH candidate CSI-RS beams to be finally indicated by DCI are updated by a MAC CE, performing rate matching of TRS resources which are QCL with the updated PDSCH candidate beams and neighboring beams (predefined according to a specific rule or RRC configuration)

In the above, methods for explicitly or implicitly distinguishing and configuring a CSI-RS resource for TRS and a CSI-RS resource for beam management/CSI acquisition have been described.

Herein, a specific CSI-RS resource(s) may be used for multiple purposes.

For example, when a UE is configured with a CSI-RS resource having properties of a periodicity, 1 port, a high frequency density, and multi-symbols according to resource setting(s), the UE may use the corresponding resource for (Rx) beam selection/correction or (or at the same time) for time/frequency tracking.

In this case, the above descriptions may be interpreted as a resource additionally for TRS, not as a TRS-dedicated resource.

It may be interpreted as the aforementioned CSI-RS having properties such as a 1 port, a short periodicity, multi-symbols in a slot, and frequency density>1.

In the above, a method in which a base station configures a TRS to a UE has been described in detail.

Hereinafter, a method in which the UE reports information (helpful information) to help the base station to determine a TRS density/pattern will be further described.

As an example of the helpful information, a UE receiver capability and/or channel estimator capability information (e.g. whether or not 2D interpolation is performed, accuracy, etc.) may be considered.

The helpful information may be expressed as control information, auxiliary information, etc.

In the case of estimation of a UE's channel, if the UE performs 2D interpolation with a time domain and a frequency domain, it is necessary to transmit a TRS to multiple symbols in a single slot for Doppler estimation: however, if not, it is enough to transmit a TRS to a single symbol.

AS an example of the helpful information, time/frequency TRS density (or pattern) information may be considered.

The time density information may be substituted by a degree of Doppler spread or information on a moving speed of the UE.

In addition, the frequency density information may be substituted by a degree of delay spread.

When a TRS is configured by aggregating multiple CSI-RS resources (in a single or consecutive slots), it is possible to report required time (and/or frequency) density and pattern information by transmitting information on a preferred CSI-RS resource (set) to the base station.

For example, if a CSI-RS resource 1($6^{th}$ symbol) and CSI-RS resource 2 ($12^{th}$ symbol) are indicated for TRS purpose, the UE may select a required resource (combination) from among {1}, {2}, and {1,2} and report the selected resource (combination) to the base station.

Herein, different CSI-RS resources may have different time/frequency density values, and selecting one (or multiple) resource from the different CSI-RS resources may bring about the same effect as reporting a required density.

In addition, the helpful information may consider TRS bandwidth information, required TRS transmission periodicity information, etc.

In addition, the helpful information may be configured based on an arbitrary combination of the above-described examples of the helpful information.

The helpful information may be information which is reported (or transmitted), just like UE capability signaling, by UE upon accessing a network, or may be on-demand information which is requested after RRC connection establishment.

In the latter case (UE capability), if BW, time/frequency density, periodicity, etc. of a (default) TRS preset by the base station are not enough for the UE or if there is no preset TRS, the UE may transmit a UL signal to the base station so as to request TRS configuration (transmission) and/or request density, periodicity, BW adjustment, etc.

Herein, the UL signal may be transmitted through a PRACH or a UL channel (e.g., a specific format of FDMed/CDMed channel, PUCCH having the PRACH (hereinafter, referred to as "BRCH" for convenience of explanation)) for beam failure recovery.

In this case, the following three procedures are all allowed.

(Procedure 1): When a UE receives configuration of a PUSCH resource along with a response from a base station after transmitting a UL signal through a PRACH/BRACH, the UE may transmit a TRS configuration request and/or density, periodicity, BW adjustment information to the base station through the configured PUSCH resource.

(Procedure 2): An additional resource for the above purpose may be defined in the PRACH/BRCH (this resource may be CDM, FDM, and/or TDM with a PRACH/BRCH resource or may be distinguishable by a message field), and a base station may receive a TRS configuration request and/or density, periodicity, BW adjustment request information via a UL signal transmitted by a UE via the above resource.

(Procedure 3): An additional resource for the above purpose may be defined in the PRACH/BRCH (this resource may be CDM, FDM, and/or TDM with a PRACH/BRCH resource or may be distinguishable by a message field), and a base station may receive a TRS configuration request via a signal transmitted by the UE via the above resource and allocate a PUSCH resource which transmits detailed request information.

The UE may transmit required density, periodicity, BW (adjustment) information via the allocated PUSCH resource.

In another example, the UL signal may be defined as being transmitted together or separately in the form of a power headroom report (PHR) and/or a specific UL signal such as a buffer status report.

In addition, a reporting triggering condition of the information may be defined additionally.

FIG. 20 is a flowchart illustrating time/frequency tracking operation of a base station which is proposed in the present disclosure.

First, the base station configures control information indicating that an antenna port for all CSI-RS resources included in a CSI-RS resource set is same (S2010).

Herein, the CSI-RS resource set may be used for tracking at least one of time or frequency.

That is, a CSI-RS for tracking may be called "tracking RS (TRS)".

In addition, the base station transmits the configured control information to a UE (S2020).

The base station transmits the CSI-RS to the UE through all the CSI-RS resources (S2030).

In particular, the antenna port may be 1-port, and the UE may be in an RRC connected state.

All the CSI-RS resources may be configured with the same periodicity.

All the CSI-RS resources may be configured in a single slot or multiple slots, and the multiple slots may be consecutive slots.

If all the CSI-RS resources are configured in the single slot, symbol locations of the CSI-RS resources may be different.

A frequency domain density for each of all the CSI-RS resources may be greater than 1.

The CSI-RS resource set is not configured for both of tracking and beam management.

The CSI-RS resources used for tracking may be configured to be QCL with a CSI-RS resource used for CSI acquisition, with a CSI-RS resource used for beam management, or with a SSB(SS/PBCH block).

The CSI-RS resources may be periodic CSI-RS resources.

In addition, a time domain measurement restriction for the CSI-RS resources may be set to "OFF".

In addition, linkage between a CSI-RS resource set of a periodic CSI-RS and a report setting is not set.

In addition, linkage between the CSI-RS resource set and a specific report setting and linkage may be set, and the specific report setting may be a null reporting setting.

Additionally, the base station may receive information about a time domain density of the CSI-RS resources from the UE.

In this case, the time domain may be the same slot or consecutive slots.

FIG. 21 is a flowchart illustrating time/frequency tracking operation of a UE which is proposed in the present disclosure.

First, the UE may receive, from the base station, control information indicating that an antenna port for all CSI-RS resources included in a CSI-RS resource set is same (S2110).

Herein, the CSI-RS resource set may be used for tracking at least one of time or frequency.

The UE receives a CSI-RS from the base station through all the CSI-RS resources (S2120).

Herein, the same antenna port may be configured for all the CSI-RS resources.

In particular, the antenna port may be 1-port, and the UE may be in an RRC connected state.

The same periodicity may be configured for all the CSI-RS resources.

All the CSI-RS resources may be configured in a single slot or multiple slots, and the multiple slots may be consecutive slots.

When all the CSI-RS resources are configured in the single slot, symbol locations for the CSI-RS resources may be different.

A frequency domain density for each of all the CSI-RS resource may be greater than 1.

The CSI-RS resource set is not configured for both of tracking and beam management.

In addition, the CSI-RS resources used for the tracking may be configured to be QCL with the CSI-RS resources used for tracking and the CSI-RS resources used for beam management.

The CSI-RS may be a periodic CSI-RS.

In addition, the UE performs tracking on at least one of time or frequency based on the received CSI-RS (S2130).

General Device to which the Present Disclosure May be Applied

FIG. 22 is a block diagram of a wireless communication device to which methods proposed in the present disclosure may be applied.

Referring to FIG. 22, a wireless communication system includes a base station 2210 and multiple UEs 2220 located within a region of the base station.

Each of the base station and the UE may be represented as a wireless device.

The base station includes a processor 2211, a memory 2212, and a radio frequency (RF) module 1613. The processor 2211 implements functions, procedures, and/or methods proposed in FIGS. 1 to 21. Layers of a wireless interface protocol may be implemented by the processor. The memory is connected to the processor and stores various types of information required to drive the processor. The RF module is connected to the processor to transmit and/or receive a wireless signal.

The UE includes a processor 221, a memory 2222, and an RF module 2223.

The processor implements functions, procedures, and/or methods proposed in FIGS. 1 to 21. Layers of a wireless interface protocol may be implemented by the processor. The memory is connected to the processor and stores various types of information required to drive the processor. The RF module is connected to the processor to transmit and/or receive a wireless signal.

The memory 2212 or 2222 may be inside or outside the processor 2211 or 2221, and may be connected to a processor through various well-known means.

In addition, the base station and/or UE may have a single antenna or multiple antennas.

The antenna 2214 or 2224 has a function of transmitting and receiving a wireless signal.

FIG. 23 is a block diagram of a communication device according to an embodiment of the present disclosure.

Particularly, FIG. 23 is a diagram illustrating a UE shown in FIG. 22 in more detail.

Referring to FIG. 23, the UE includes a processor (or digital signal processor; DSP) 2310, an RF module (RF unit) 2335, a power management module 2305, an antenna 2340, a battery 2255, a display 2315, a keypad 2320, a memory 2330, a Subscriber Identification Module (SIM) card 2325 (which may be optional), a speaker 2345 and a microphone 2350. The UE may include a single antenna or multiple antennas.

The processor 2310 may be configured to implement the functions, procedures and/or methods proposed by the present disclosure as described in FIGS. 1 to 21. Layers of a wireless interface protocol may be implemented by the processor 2310.

The memory 2330 is connected to the processor 2310 and stores information related to operations of the processor 2310. The memory 2330 may be located inside or outside the processor and may be connected to the processors through various well-known means.

A user enters instructional information, such as a telephone number, for example, by pushing the buttons of a keypad 2320 or by voice activation using the microphone 2350. The processor receives and processes the instructional information to perform the appropriate function, such as to dial the telephone number. Operational data may be retrieved from the SIM card 2325 or the memory 2330 to perform the function. Furthermore, the processor may display the instructional and operational information on the display 2315 for the user's reference and convenience.

The RF module 2335 is connected to the processor, transmits and/or receives an RF signal. The processor forwards instructional information to the RF module, to initiate communication, for example, transmits radio signals comprising voice communication data. The RF module includes a receiver and a transmitter to receive and transmit radio signals. An antenna 2340 facilitates the transmission and reception of radio signals. Upon receiving radio signals, the RF module may forward and convert the signals to baseband frequency for processing by the processor. The processed signals may be transformed into audible or readable information outputted via the speaker 2345.

FIG. 24 is a diagram illustrating an example of an RF module of a wireless communication apparatus to which the method proposed in the present disclosure may be applied.

Particularly, FIG. 24 shows an example of an RF module that may be implemented in Frequency Division Duplex (FDD) system.

First, in a transmit path, the processor described in FIGS. 22 and 23 processes data to be transmitted and provides an analog output signal to transmitter 2410.

Within the transmitter 2410, the analog output signal is filtered by a low pass filter (LPF) 2411 to remove undesired images caused by prior digital-to-analog conversion (ADC), upconverted from baseband to RF by an upconverter (Mixer) 2412, and amplified by a variable gain amplifier (VGA) 2413. The amplified signal is filtered by a filter 2414, further amplified by a power amplifier (PA) 2415, routed through duplexer(s) 2450/antenna switch(s) 2460, and transmitted via an antenna 2470.

In addition, in the receive path, an antenna 2470 receives signals from exterior and provides the received signals, which is routed through antenna switch(s) 2460/duplexer(s) 2450 and provided to the receiver 2420.

Within the receiver 2420, the received signal is amplified by a low noise amplifier (LNA) 2423, filtered by a band pass filter 2424, and downconverted from RF to baseband by a downconverter (Mixer) 2425.

The downconverted signal is filtered by a low pass filter (LPF) 2426, and amplified by a VGA 2427 to obtain an analog input signal, which is provided to the processor described in FIG. 22 and FIG. 23.

Further, a local oscillator (LO) generator 2440 generates and provides transmission and reception LO signals to upconverter 2412 and downconverter 2425, respectively.

In addition, a phase locked loop (PLL) 2430 may receive control information from the processor and provide control signals to LO generator 2440 to generate the transmission and reception LO signals at the proper frequencies.

The circuits shown in FIG. 24 may be arranged differently from the configuration shown in FIG. 24.

FIG. 25 is a diagram illustrating another example of an RF module of a wireless communication apparatus to which the method proposed in the present disclosure may be applied.

Particularly, FIG. 25 shows an example of an RF module that may be implemented in Time Division Duplex (TDD) system.

The transmitter 2510 and the receiver 2520 of the RF module in the TDD system are the same as the structures of the transmitter and the receiver of the RF module in the FDD system.

Hereinafter, only the structure of the RF module of the TDD system is described, which is different from the RF module of the FDD system, and the same structure is referred to the description of FIG. 24.

The signal amplified by a power amplifier (PA) 2515 of a transmitter is routed through a band select switch 2550, a band pass filter (BPF) 2560 and an antenna switch(s) 2570, and transmitted via an antenna 2580.

Further, in the receive path, the antenna 2580 receives signals from exterior and provides the received signals, which is routed through the antenna switch(s) 2570, the band pass filter (BPF) 2560, and the band select switch 2550, and provided to the receiver 2520.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

INDUSTRIAL APPLICABILITY

A method of mapping a reference signal in the wireless communication system of the present invention has been described with reference to an example applied to a 3GPP LTE/LTE-A system or a 5G system (New RAT system), it is also applicable to various wireless communication systems.

The invention claimed is:

1. A method of transmitting, by a base station, a channel state information (CSI)-reference signal (RS) in a wireless communication system, the method comprising:
configuring control information for a plurality of CSI-RS resources, with the control information indicating that an antenna port for the plurality of CSI-RS resources configured for tracking at least one of a time or a frequency is the same;
transmitting, to a user equipment (UE), the control information; and
transmitting, to the UE, the CSI-RS through the same antenna port on the plurality of CSI-RS resources based on the control information,
wherein the plurality of CSI-RS resources are configured in a single slot and located at different symbol locations in the single slot, and only one of the plurality of CSI-RS resources is located at a single symbol in the single slot,
wherein different symbol locations of the plurality of CSI-RS resources in the single slot are not contiguous,
wherein the plurality of CSI-RS resources are periodic CSI-RS resources, and
wherein a linkage between the plurality of CSI-RS resources and a report setting is not configured.

2. The method of claim 1, wherein the UE is in a radio resource control (RRC) connected state.

3. The method of claim 1, wherein code division multiplexing (CDM) is not applied to the plurality of CSI-RS resources.

4. The method of claim 1, wherein a frequency domain density of each of the plurality of CSI-RS resources is greater than 1.

5. The method of claim 1, wherein the plurality of CSI-RS resources are not configured both for the tracking and for reporting L1(layer 1)-RSRP(reference signal received power).

6. The method of claim 1, wherein a first CSI-RS resource, among the plurality of CSI-RS resources that are used for the tracking is quasi co-located (QCL) with (i) a second CSI-RS resource that is used for CSI acquisition, (ii) a third CSI-RS resource that is used for beam management, or (iii) an synchronization signal/physical broadcast channel block (SSB).

7. The method of claim 1, further comprising:
receiving, from the UE, information related to a time-domain density of the CSI-RSs.

8. A method of receiving, by a user equipment (UE), a channel state information (CSI)-reference signal (RS) in a wireless communication system, the method comprising:

receiving, from a base station, configuration information for a plurality of CSI-RS resources, wherein the configuration information comprises control information indicating that an antenna port for the plurality of CSI-RS resources configured for tracking at least one of a time or a frequency is the same;

receiving, from the base station, the CSI-RS through the same antenna port on the plurality of CSI-RS resources based on the control information; and tracking at least one of the time or the frequency based on the CSI-RS, wherein the plurality of CSI-RS resources are configured in a single slot and located at different symbol locations in the single slot, and only one of the plurality of CSI-RS resources is located at a single symbol in the single slot, wherein different symbol locations of the plurality of CSI-RS resources in the single slot are not contiguous, wherein the plurality of CSI-RS resources are periodic CSI-RS resources, and wherein a linkage between the plurality of CSI-RS resources and a report setting is not configured.

9. A base station configured to transmit a channel state information (CSI)-reference signal (RS) in a wireless communication system, the base station comprising:

a transmitter configured to transmit a wireless signal;
a receiver configured to receive a wireless signal;
at least one processor; and
at least one computer memory operably connectable to the at least one processor and storing instructions that, when executed, cause the at least one processor perform operations comprising:

configuring control information for a plurality of CSI-RS resources, with the control information indicating that an antenna port for the plurality of CSI-RS resources configured for tracking at least one of a time or a frequency is the same;

transmitting, to a user equipment (UE), the control information; and transmitting, to the UE, the CSI-RS through the same antenna port on the plurality of CSI-RS resources based on the control information, wherein the plurality of CSI-RS resources are configured in a single slot and located at different symbol locations in the single slot, and only one of the plurality of CSI-RS resources is located at a single symbol in the single slot, wherein different symbol locations of the plurality of CSI-RS resources in the single slot are not contiguous, wherein the plurality of CSI-RS resources are periodic CSI-RS resources, and wherein a linkage between the plurality of CSI-RS resources and a report setting is not configured.

10. The method of claim 8, wherein the UE is in a radio resource control (RRC) connected state.

11. The method of claim 8, wherein code division multiplexing (CDM) is not applied to the plurality of CSI-RS resources.

12. The method of claim 8, wherein a frequency domain density of each of the plurality of CSI-RS resources is greater than 1.

13. The method of claim 8, wherein the plurality of CSI-RS resources are not configured both for the tracking and for reporting L1 (layer 1)-RSRP(reference signal received power).

14. The method of claim 8, wherein a first CSI-RS resource, among the plurality of CSI-RS resources that are used for the tracking is quasi co-located (QCL) with (i) a second CSI-RS resource that is used for CSI acquisition, (ii) a third CSI-RS resource that is used for beam management, or (iii) an synchronization signal/physical broadcast channel block (SSB).

15. The method of claim 8, further comprising:
transmitting, to the base station, information related to a time-domain density of the CSI-RSs.

16. A terminal configured to receive a channel state information (CSI)-reference signal (RS) in a wireless communication system, the terminal comprising:

a transmitter configured to transmit a wireless signal;
a receiver configured to receive a wireless signal;
at least one processor; and
at least one computer memory operably connectable to the at least one processor and storing instructions that, when executed, cause the at least one processor perform operations comprising:

receiving, from a base station, configuration information for a plurality of CSI-RS resources, wherein the configuration information comprises control information indicating that an antenna port for the plurality of CSI-RS resources configured for tracking at least one of a time or a frequency is the same;

receiving, from the base station, the CSI-RS through the same antenna port on the plurality of CSI-RS resources based on the control information; and tracking at least one of the time or the frequency based on the CSI-RS, wherein the plurality of CSI-RS resources are configured in a single slot and located at different symbol locations in the single slot, and only one of the plurality of CSI-RS resources is located at a single symbol in the single slot, wherein different symbol locations of the plurality of CSI-RS resources in the single slot are not contiguous, wherein the plurality of CSI-RS resources are periodic CSI-RS resources, and wherein a linkage between the plurality of CSI-RS resources and a report setting is not configured.

* * * * *